US012081953B2

(12) United States Patent
D'Amato et al.

(10) Patent No.: US 12,081,953 B2
(45) Date of Patent: Sep. 3, 2024

(54) PASSIVE SPEAKER AUTHENTICATION

(71) Applicant: Sonos, Inc., Santa Barbara, CA (US)

(72) Inventors: Nicholas D'Amato, Santa Barbara, CA (US); Benjamin Rappoport, Santa Barbara, CA (US); Dayn Wilberding, Santa Barbara, CA (US); Timothy Sheen, Santa Barbara, CA (US); Andrea Testa, Santa Barbara, CA (US); Nash Reilly, Santa Barbara, CA (US); Hilmar Lehnert, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 434 days.

(21) Appl. No.: 17/272,048

(22) PCT Filed: Aug. 28, 2019

(86) PCT No.: PCT/US2019/048569
§ 371 (c)(1),
(2) Date: Feb. 26, 2021

(87) PCT Pub. No.: WO2020/047094
PCT Pub. Date: Mar. 5, 2020

(65) Prior Publication Data

US 2022/0132246 A1 Apr. 28, 2022

Related U.S. Application Data

(63) Continuation of application No. 16/115,525, filed on Aug. 28, 2018, now Pat. No. 11,206,484.

(51) Int. Cl.
*H04R 3/04* (2006.01)
*H04R 3/12* (2006.01)
*H04R 29/00* (2006.01)

(52) U.S. Cl.
CPC ................ *H04R 3/04* (2013.01); *H04R 3/12* (2013.01); *H04R 29/001* (2013.01); *H04R 2227/005* (2013.01); *H04R 2420/07* (2013.01)

(58) Field of Classification Search
CPC ........ H04R 2420/05; H04R 5/04; H04R 3/00; H04R 3/04; H04R 1/1041; H04S 7/308
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

CN 101416533 A 4/2009
CN 104255042 A 12/2014
(Continued)

OTHER PUBLICATIONS

International Search Report mailed on Nov. 25, 2019, issued in connection with International Application No. PCT/US2019/048569, filed on Aug. 28, 2019, 3 pages.
(Continued)

*Primary Examiner* — Kile O Blair
(74) *Attorney, Agent, or Firm* — Fortem IP LLP

(57) ABSTRACT

Systems and methods for authenticating a passive speaker include (i) activating, by a playback device configured to drive the passive speaker, a passive speaker identification circuit of the passive speaker by providing an identification signal to an input terminal of the passive speaker, wherein the passive speaker is a particular type of passive speaker having particular acoustic characteristics; (ii) while the passive speaker identification circuit is active, measuring, by the playback device, an electrical current of the identification signal; (iii) determining, based on the measured elec-
(Continued)

trical current of the identification signal, an impedance modulation of the passive speaker; (iv) determining, by the playback device, the particular type of the passive speaker based on the impedance modulation of the passive speaker; and (v) applying, by the playback device, a calibration to the playback device based on the determined particular type of the passive speaker.

20 Claims, 14 Drawing Sheets

(56) References Cited

U.S. PATENT DOCUMENTS

| | | | | |
|---|---|---|---|---|
| 5,923,902 | A | 7/1999 | Inagaki | |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,031,476 | B1 * | 4/2006 | Chrisop | H04R 3/00 381/59 |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 9,247,365 | B1 | 1/2016 | Ellis et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2002/0136414 | A1 * | 9/2002 | Jordan | H04S 3/00 381/59 |
| 2003/0157951 | A1 | 8/2003 | Hasty, Jr. | |
| 2004/0024478 | A1 | 2/2004 | Hans et al. | |
| 2004/0071294 | A1 | 4/2004 | Halgas, Jr. et al. | |
| 2007/0142944 | A1 | 6/2007 | Goldberg et al. | |
| 2009/0274312 | A1 | 11/2009 | Howard et al. | |
| 2015/0078596 | A1 | 3/2015 | Sprogis | |
| 2016/0373860 | A1 | 12/2016 | Leschka et al. | |
| 2017/0242649 | A1 | 8/2017 | Jarvis et al. | |

FOREIGN PATENT DOCUMENTS

| | | | |
|---|---|---|---|
| CN | 105163221 | A | 12/2015 |
| CN | 106851475 | A | 6/2017 |
| DE | 10 2007 032281 | A1 | 1/2009 |
| DE | 102007032281 | A1 | 1/2009 |
| EP | 1389853 | A1 | 2/2004 |
| WO | 200153994 | | 7/2001 |
| WO | 2003093950 | A2 | 11/2003 |
| WO | 2009007322 | A2 | 1/2009 |

OTHER PUBLICATIONS

Written Opinion mailed on Nov. 25, 2019, issued in connection with International Application No. PCT/US2019/048569, filed on Aug. 28, 2019, 10 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, First Office Action and Translation mailed on Dec. 28, 2021, issued in connection with Chinese Application No. 201980070921.6, 12 pages.
Chinese Patent Office, Second Office Action and Translation mailed on Feb. 22, 2022, issued in connection with Chinese Application No. 201980070921.6, 8 pages.
European Patent Office, European EPC Article 94.3 mailed on Nov. 22, 2022, issued in connection with European Application No. 19766156.4, 10 pages.

* cited by examiner

420

| FREQUENCY | SPEAKER ID DATA |
|---|---|
| 25 kHz | DATA 1 |
| 30 kHz | DATA 2 |
| 35 kHz | DATA 3 |
| 40 kHz | DATA 4 |
| 45 kHz | DATA 5 |

*Fig. 4C*

PASSIVE SPEAKER AUTHENTICATION

CROSS-REFERENCE TO RELATED APPLICATION

This application is the US national phase under 35 U.S.C. § 371 of International Application No. PCT/US2019/048569, filed Aug. 28, 2019, which claims priority to U.S. patent application Ser. No. 16/115,525, filed Aug. 28, 2018, which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4C is a simplified diagram of a database of speaker identification data.

Figure 1A:
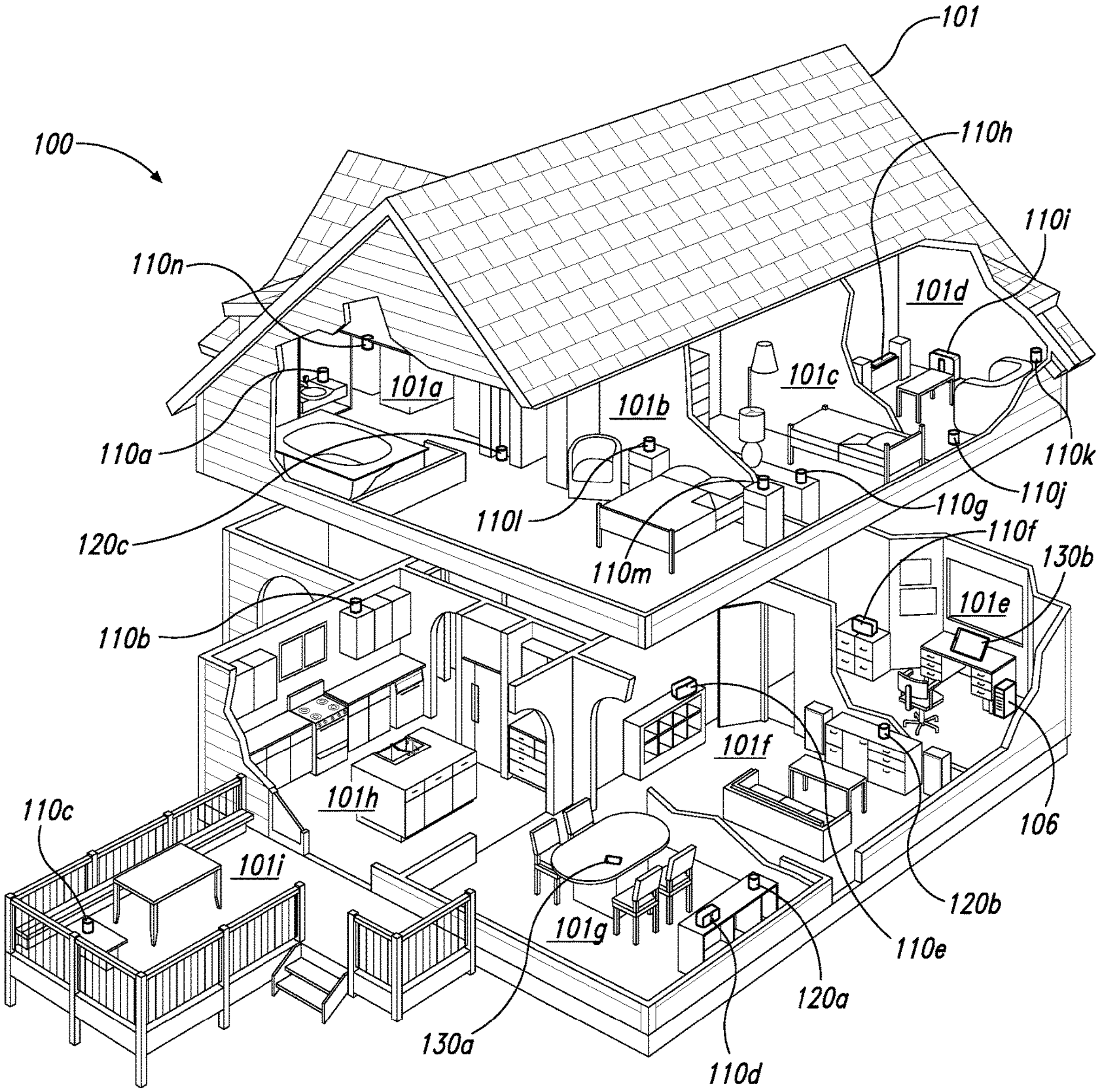
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Any environment has certain acoustic characteristics ("acoustics") that define how sound travels within that environment. For instance, with a room, the size and shape of the room, as well as objects inside that room, may define the acoustics for that room. For example, angles of walls with respect to a ceiling affect how sound reflects off the wall and the ceiling. As another example, furniture positioning in the room affects how the sound travels in the room. Various types of surfaces within the room may also affect the acoustics of that room; hard surfaces in the room may reflect sound, whereas soft surfaces may absorb sound. Accordingly, calibrating a playback device within a room so that the audio output by the playback device accounts for (e.g., offsets) the acoustics of that room may improve a listening experience in the room.

In order to effectively calibrate a playback device without damaging any components due to the calibration, audio characteristics and limitations of all components in the audio signal path are considered during the calibration. In the case of a playback device designed to be coupled to externally connected passive speakers, calibration may not be performed unless characteristics of the passive speakers are known.

U.S. Pat. No. 9,706,323 entitled, "Playback Device Calibration," and U.S. Pat. No. 9,763,018 entitled, "Calibration of Audio Playback Devices," which are hereby incorporated by reference in their entirety, provide examples of calibrating playback devices to account for the acoustics of a room.

These example calibration processes involve a playback device outputting audio content while in a given environment (e.g., a room). The audio content may have predefined spectral content, such as a pink noise, a sweep, or a combination of content. Then, one or more microphone devices detect the outputted audio content at one or more different spatial positions in the room to facilitate determining an acoustic response of the room (also referred to herein as a "room response").

For example, a mobile device with a microphone, such as a smartphone or tablet (referred to herein as a network device) may be moved to the various locations in the room to detect the audio content. These locations may correspond to those locations where one or more listeners may experience audio playback during regular use (i.e., listening) of the playback device. In this regard, the calibration process involves a user physically moving the network device to various locations in the room to detect the audio content at one or more spatial positions in the room. Given that this acoustic response involves moving the microphone to multiple locations throughout the room, this acoustic response may also be referred to as a "multi-location acoustic response."

Based on a multi-location acoustic response, the media playback system may identify an audio processing algorithm. For instance, a network device may identify an audio processing algorithm, and transmit to the playback device, data indicating the identified audio processing algorithm. In some examples, the network device identifies an audio processing algorithm that, when applied to the playback device, results in audio content output by the playback device having a target audio characteristic, such as a target frequency response at one or more locations in the room.

The network device can identify the audio processing algorithm using various techniques. In one case, the network device determines the audio processing algorithm based on the data indicating the detected audio content. In another case, the network device sends, to a computing device such as a server, data indicating the audio content detected at the various locations in the room, and receives, from the computing device, the audio processing algorithm after the server (or another computing device connected to the server) has determined the audio processing algorithm.

However, as noted above, this calibration process may not be suitable for a particular playback device. For example, some playback devices include an amplifier configured to drive one or more passive speakers external to the playback device via a corresponding wire or cable. Passive speakers may include, for example, those speakers configured to draw power from an external amplifier (e.g., the amplifier in a playback device) to drive one or more transducers. Passive speakers typically do not draw power from a power source separate from the external amplifier, such as an internal battery and/or a wall outlet. As a result, passive speakers typically do not comprise active electronic components that require a separate power source. These passive speakers may have audio characteristics (e.g., frequency response, sensitivity, maximum power rating, etc.) that are unknown to the playback device. Given that passive speakers typically do not comprise powered communication circuitry (e.g., WI-FI radios, BLUETOOTH radios, etc.), the passive speakers generally do not have a mechanism by which to provide information to the playback device, such as the audio characteristics of the passive speaker. Without knowing the audio characteristics of the passive speakers, the playback device may have the potential to damage the passive speakers when performing the calibration process. For instance, when the playback device outputs a calibration tone through the passive speakers, the playback device could attempt to drive the passive speakers with an electrical current that exceeds the capabilities of, and thereby damages, the passive speakers.

Disclosed herein are systems and methods to help address these or other issues. In particular, a playback device performs a passive speaker authentication process to identify a type of a passive speaker coupled to the playback device for purposes of determining whether the passive speaker is compatible with the calibration process and/or for adjusting the calibration process to account for the audio characteristics of the passive speaker. In some embodiments, such passive speaker authentication process advantageously does not employ expensive active electronic components that require a separate power source. Thus, the cost and manufacturing complexity of the passive speaker is not substantially increased while still enabling the playback device to uniquely identify the passive speakers. For example, a passive speaker identification circuit comprising one or more passive components (e.g., RFID tags, NFC tags, LCR circuits, passive filters, passive antennas, etc.) may be integrated into the passive speaker and activated by the playback device. In turn, the playback device may detect a response from the passive speaker identification circuit and employ the response to uniquely identify the passive speaker. It should be appreciated that, in other embodiments, the passive speaker identification circuit may comprise one or more active components (alone or in combination with the one or more passive components). As a result, implementations of the passive speaker identification circuit are not limited to those implementations that only comprise passive electronic components.

In one example, the playback device probes the passive speaker with an identification signal. The playback device sends the identification signal to input terminals of the passive speaker over the same conductors (e.g., speaker wire) that the playback device uses to drive the passive speaker with audio signals.

The passive speaker includes a passive speaker identification circuit that receives and is activated by the identification signal. While activated, the passive speaker identification circuit modulates an input impedance of the passive speaker. To modulate the impedance, the passive speaker identification circuit switches a load in parallel or in series with the input terminals of the passive speaker, or, in some examples, the passive speaker identification circuit toggles a switch to create an open circuit at the input terminals.

The passive speaker identification circuit can modulate the impedance of the passive speaker in various ways. In one example, the load includes an LCR circuit having a particular resonant frequency, such that connecting and/or disconnecting the load to the input terminals of the passive speaker modulates the impedance more significantly at the resonant frequency than at other frequencies. In another example, the passive speaker identification circuit modulates the impedance of the passive speaker in a particular pattern, such as in a pattern that encodes a binary (or other such as octal or hexadecimal) signal at the input terminals of the passive speaker.

The playback device then detects the modulated input impedance of the passive speaker. For instance, the playback device includes a current sensor for measuring the current of signals that the playback device outputs to the passive speaker. As such, the playback device measures the current of the identification signal output by the playback device and, based on the measured current, determines that the impedance of the passive speaker has been modulated.

Based on the detected modulated impedance of the passive speaker, the playback device determines the type of the passive speaker, such as by determining particular audio characteristics of the passive speaker. For instance, the playback device can output an identification signal comprising a series of identification tones having respective frequencies and, based on the measured current of the identification tones at each respective frequency, determine the frequency at which the passive speaker identification circuit has most substantially modified the input impedance of the passive speaker. The playback device can then reference a database (e.g., on the playback device itself and/or remotely on another device that is accessible by the playback device such as a cloud server) to obtain particular audio characteristics of the passive speaker that are stored in the database and associated with the determined frequency.

In other examples, the passive speaker identification circuit encodes data representing various characteristics of the passive speaker by modulating the impedance of the passive speaker in a particular pattern corresponding to a binary signal, as described above. The playback device measures the current of the identification signal to detect modulations of the input impedance throughout this process and detects the modulation pattern. Based on the detected pattern, the playback device decodes the data and determines the characteristics of the passive speaker.

Once the playback device determines the type of the passive speaker, for instance by determining particular characteristics of the passive speaker, the playback device determines whether the passive speaker is compatible with the calibration process described above. If the playback device determines that the passive speaker is compatible, then the playback device performs the calibration process according to characteristics of the passive speaker. If the playback device determines that the passive speaker is incompatible, then the playback device does not perform the calibration process. In some examples, if the playback device determines that the passive speaker is not compatible, then the playback device adjusts the calibration process from its default configuration (e.g., by limiting current, voltage, and/or power levels of audio signals that the playback device outputs during the calibration process) so that the passive speaker is compatible with the adjusted calibration process. The playback device can then perform the adjusted calibration process.

Accordingly, in some implementations, for example, a playback device includes one or more output terminals couplable to an input terminal of a passive speaker of a particular type, the particular type of passive speaker having particular acoustic characteristics. The playback device further includes an audio stage comprising one or more audio amplifiers configured to drive passive speakers connected to the one or more output terminals, the one or more audio amplifiers comprising a current sensor. Further, the playback device includes one or more processors and a housing carrying the one or more output terminals, the audio stage, the one or more processors, and data storage, the data storage having stored thereon instructions executable by the one or more processors to cause the playback device to perform various operations. The operations include activating a passive speaker identification circuit of the passive speaker by outputting, via the one or more audio amplifiers and the one or more output terminals, an identification signal to the input terminal of the passive speaker. The operations further include, while the passive speaker identification circuit is active, measuring, via the current sensor, an electrical current of the identification signal and determining, based on the measured electrical current, an impedance modulation of the passive speaker. Additionally, the operations include determining the particular type of the passive speaker based on the determined impedance modulation of the passive speaker, and applying a calibration to the playback device based on the determined particular type of the passive speaker.

In other examples, the passive speaker identification circuit includes passive speaker identification data stored on a readable data tag, such as a near-field communication (NFC) tag or a radio-frequency identification (RFID) tag. In such examples, the playback device includes a reader circuit, such as an NFC reader or an RFID reader, that queries the data tag for the passive speaker identification data. Unlike a conventional implementations of such readable data tags where a reader circuit wirelessly communicates with the data tag over a short distance, the signals from the reader circuit in the playback device are carried over a wired connection (e.g., speaker wire or another cable) to the data tag in the passive speaker so as to substantially increase the usable range. Thus, the reader circuit in the playback device can read a data tag in a passive speaker that is located a substantial distance away from the reader circuit in the playback device (e.g., more than 5 inches away, such as between 5 inches and 120 feet away, between 5 inches and 60 feet away, between 10 inches and 120 feet away, between 10 inches and 60 feet away, etc.). To facilitate this, the reader circuit can be electrically coupled to the output terminals of the playback device, and the data tag can be electrically coupled to the input terminals of the passive speaker. As such, the reader circuit can output a query signal via the output terminals of the playback device, and the data tag can receive the query signal via the input terminals of the passive speaker. The data tag can then encode the passive speaker identification data in a response signal, which is received by the reader circuit via the input terminals of the passive speaker and the output terminals of the playback device. The playback device can then use the passive speaker identification data to determine various characteristics of the passive speaker and apply an appropriate calibration to the playback device.

Accordingly, in some implementations, a system includes a playback device and a passive speaker of a particular type, the particular type of passive speaker having particular acoustic characteristics. The playback device includes one or more output terminals couplable to one or more input terminals of the passive speaker, and the playback device also includes an audio stage comprising one or more audio amplifiers configured to drive the passive speaker when connected to the one or more output terminals. Further, the playback device includes a reader circuit, one or more processors, data storage having stored thereon instructions executable by the one or more processors to cause the playback device to perform operations, and a housing carrying the one or more output terminals, the audio stage, the reader circuit, the one or more processors, and the data storage. The passive speaker includes at least one transducer electrically coupled to the one or more input terminals. The at least one transducer is configured to generate sound based on an audio drive signal received from the playback device via the one or more input terminals of the passive speaker. The passive speaker further includes a passive speaker identification circuit electrically coupled between the one or more input terminals and the at least one transducer, as well as a housing carrying the one or more input terminals, the at least one transducer, and the passive speaker identification circuit. The operations performed by the playback device upon execution of the instructions by the one or more processors include querying the passive speaker identification circuit of the passive speaker by causing the reader circuit to output, via the one or more output terminals, a query signal to the one or more input terminals of the passive speaker. The passive speaker identification circuit receives the query signal from the playback device via the one or more input terminals, generates a response signal based on the query signal, and transmits the response signal to the playback device via the one or more input terminals. And the reader circuit receives the response signal via the one or more output terminals of the playback device. The operations further include determining the particular type of the passive speaker based on the response signal and applying a calibration to the playback device based on the determined particular type of the passive speaker.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" (or "responsive to") another element or function. "Based on" should be understood that one element or function is related to another function or element. "In response to" should be understood that one element or function is a necessary result of another function or element. For the sake of brevity, functions are generally described as being based on another function when a functional link exists; however, disclosure of either type of relationship should be understood as disclosing both types of functional relationship. In the claims, the functional relationship should be interpreted as recited.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs") 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100*a*) in synchrony with a second playback device (e.g., the playback device 100*b*). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the outdoor patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, “System and method for synchronizing operations among a plurality of independently clocked digital data processing devices,” which is incorporated herein by reference in its entirety.

a. Suitable Media Playback System

Figure 1B:
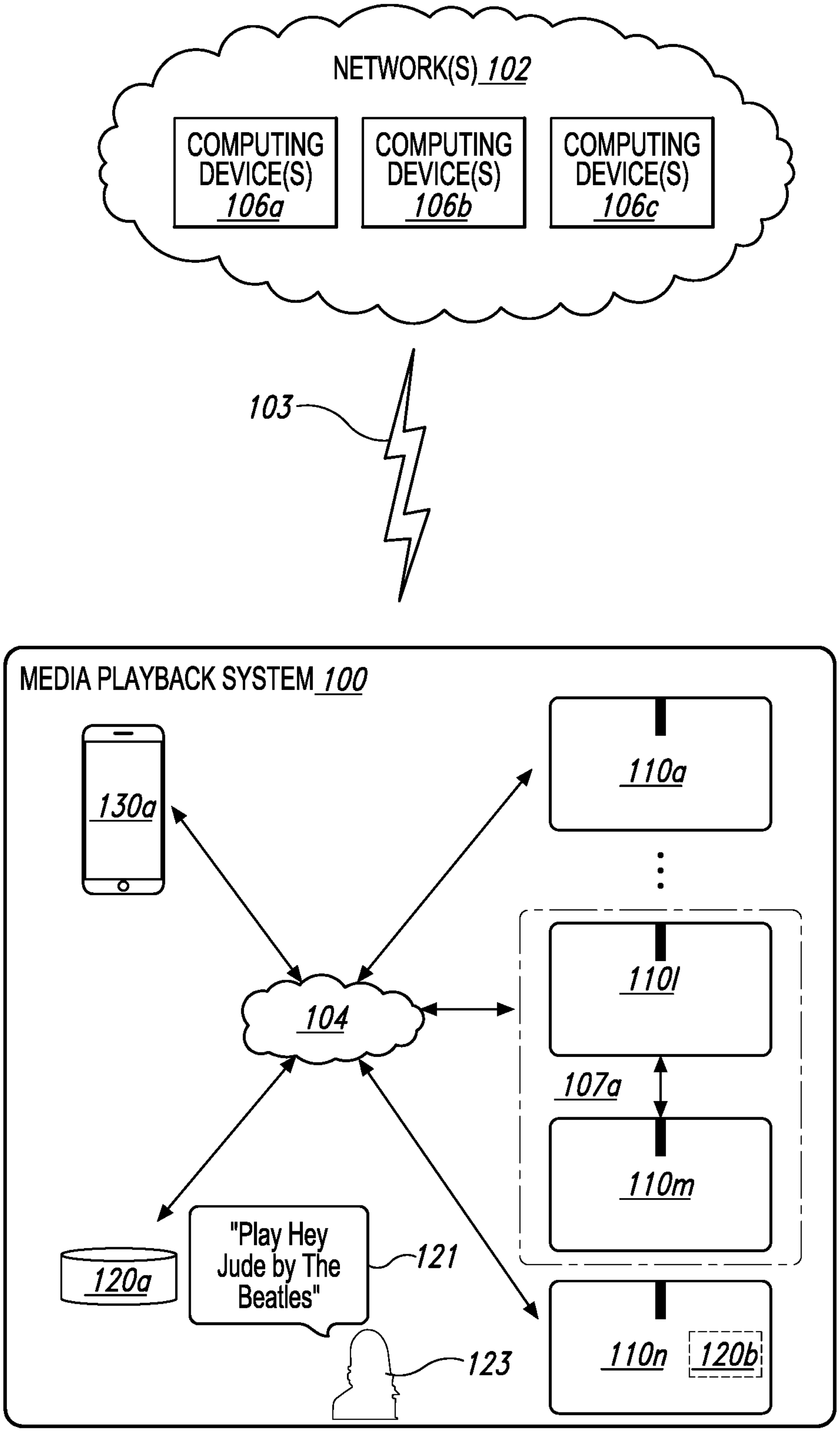
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as “the links 103”) communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, “WiFi” can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
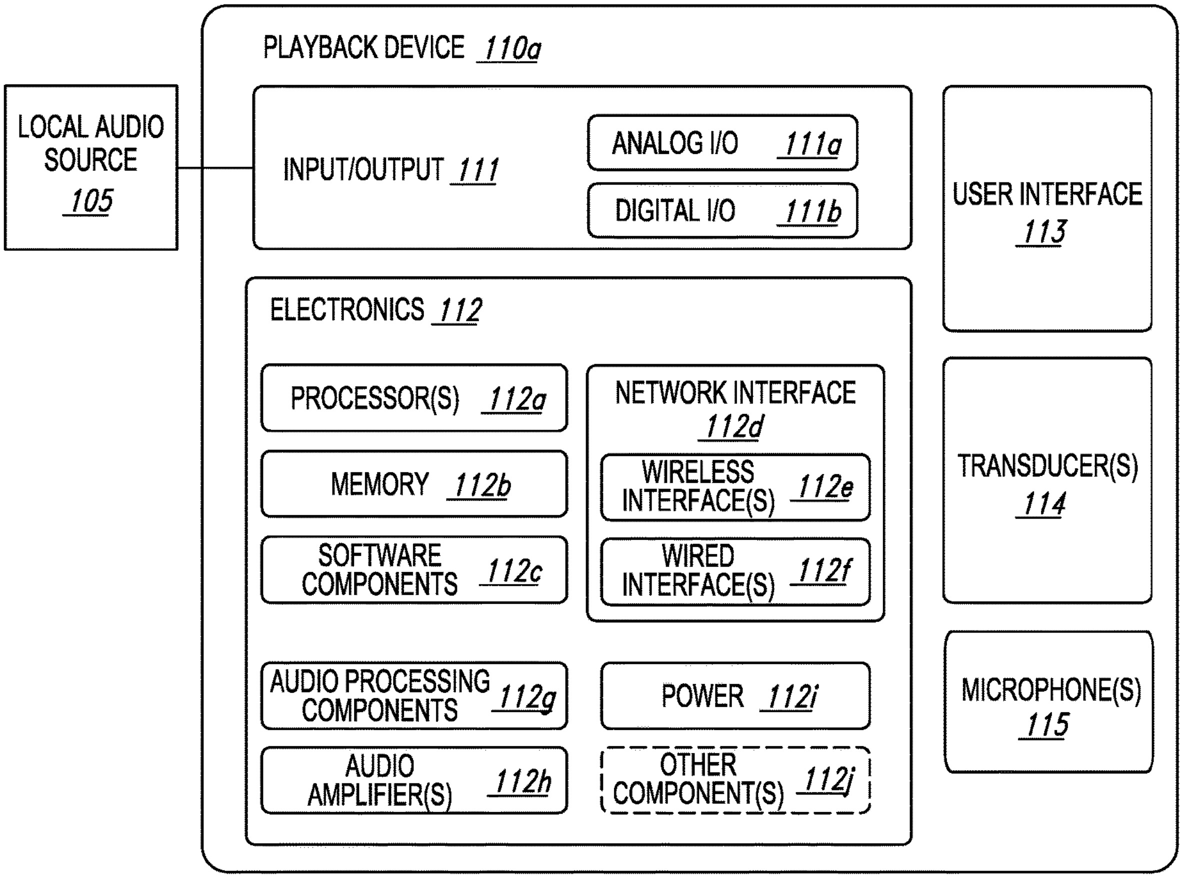
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some embodiments, the operations further include causing the playback device 110*a* to send audio data to another one of the playback devices 110*a* and/or another device (e.g., one of the NMDs 120). Certain embodiments include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some embodiments, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated embodiment of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112*d* includes the wired interface 112*f* and excludes the wireless interface 112*e*. In some embodiments, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
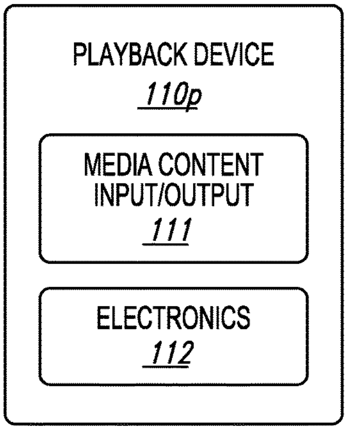
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
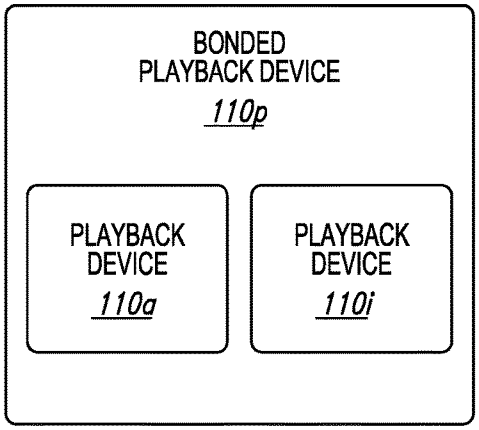
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

Figure 1F:
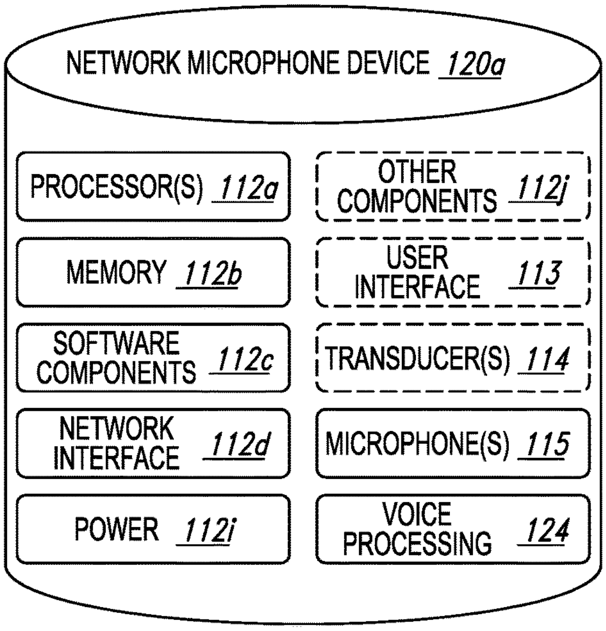
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 112*h*, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

Figure 1G:
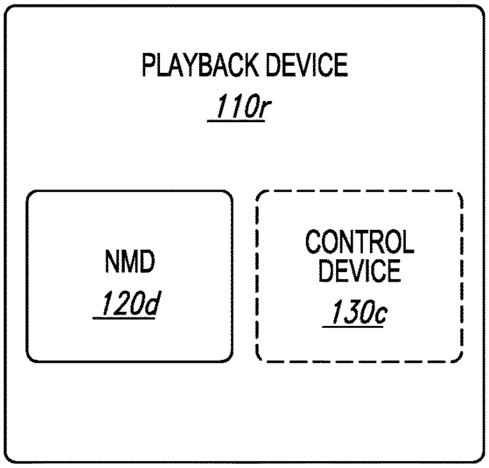
FIG. 1G is a block diagram of a playback device.

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
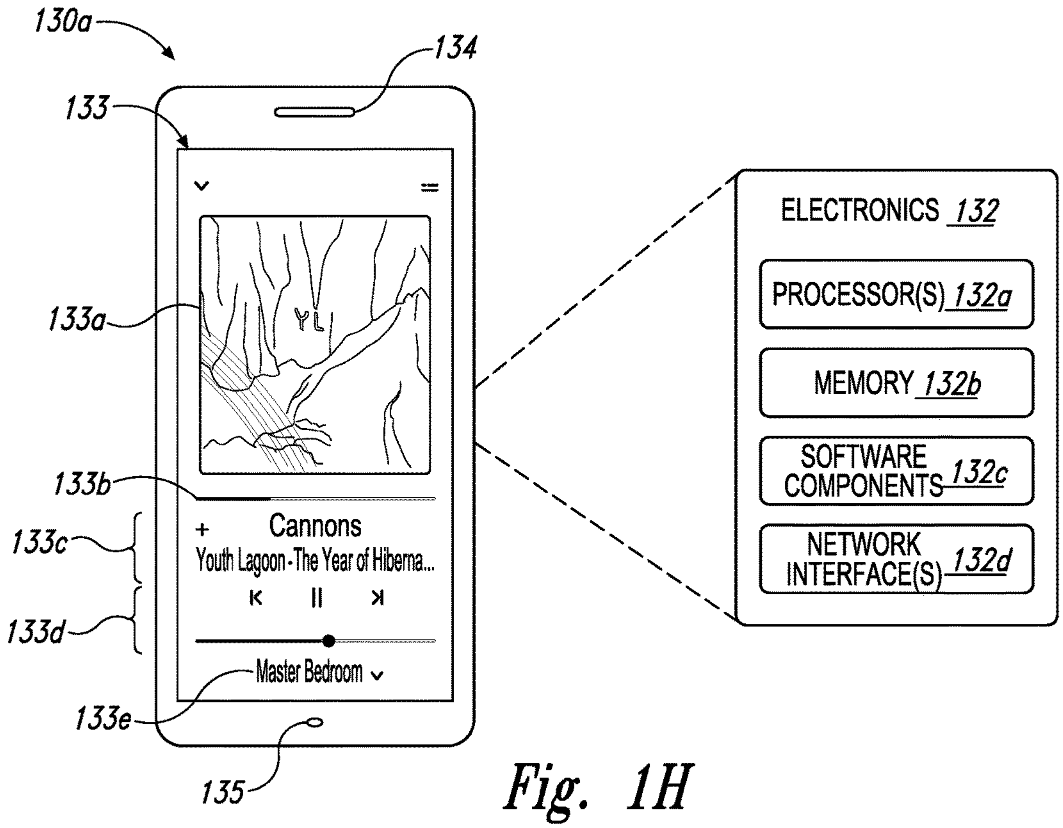
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Playback Device Calibration

As discussed above, in some examples, a playback device is configured to calibrate itself to account for an acoustic response of a room in which the playback device is located. For example, based on the acoustic response of the room, the playback device may identify an audio processing algorithm that, when applied to the playback device, results in audio content output by the playback device having a target audio characteristic, such as a target frequency response, at one or more locations in the room.

In one example, calibration of the playback device may be initiated when the playback device is being set up for the first time, when the playback device first outputs music or some other audio content, or when the playback device has been moved to a new location. For instance, if the playback device has been moved to a new location, calibration of the playback device may be initiated based on a detection of the movement (e.g., via a global positioning system (GPS), one or more accelerometers, or wireless signal strength variations), or based on a user input indicating that the playback device has moved to a new location (e.g., a change in playback zone name associated with the playback device, such as from “Kitchen” to “Living Room”).

In another example, calibration of the playback device may be initiated via a controller device, such as the controller device 130*a* depicted in FIG. 1H. For instance, a user may access a controller interface for the playback device to initiate calibration of the playback device 210*b*. In one case, the user may access the controller interface, and select the playback device (or a group of playback devices that includes the playback device) for calibration. In some cases, a calibration interface may be provided as part of a playback device controller interface to allow a user to initiate playback device calibration. Other examples are also possible.

Further, in some examples, calibration of the playback device is initiated periodically, or after a threshold amount of time has elapsed after a previous calibration, in order to account for changes to the environment of the playback device. For instance, a user may change an environment of the playback device (e.g., by adding, removing, or rearranging furniture), thereby altering the acoustic response of the environment. As a result, any calibration settings applied to the playback device before the alteration may have a reduced efficacy of accounting for, or offsetting, the altered acoustic response of the environment. Initiating calibration of the playback device periodically, or after a threshold amount of time has elapsed after a previous calibration, can help address this issue by updating the calibration settings at a later time (i.e., after the environment is altered) so that the calibration settings applied to the playback device are based on the altered acoustic response of the environment.

Figure 2:
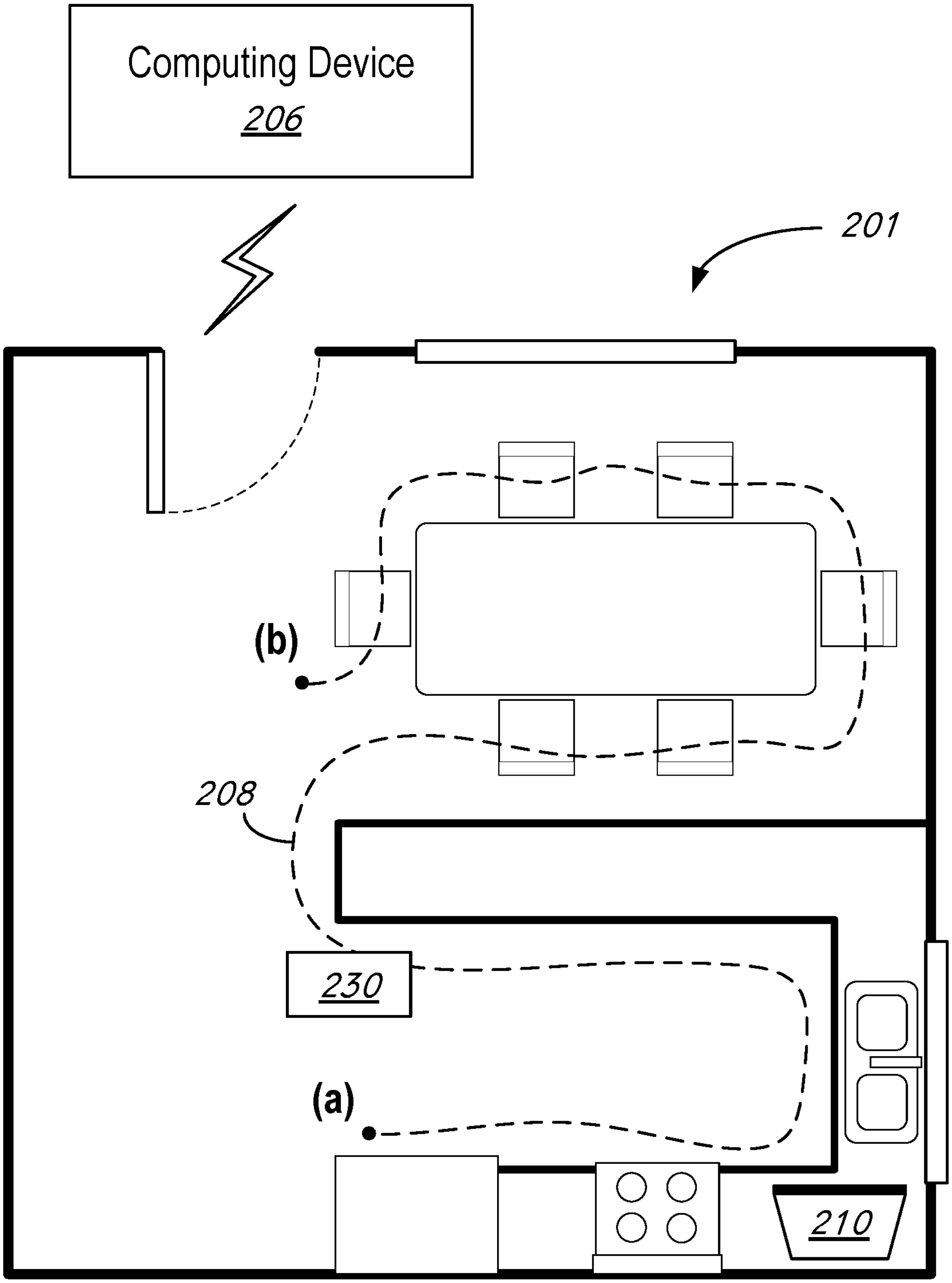
FIG. 2 is a diagram of a playback environment within which a playback device may be calibrated.

FIG. 2 depicts an example environment for using an acoustic response of a room to determine calibration settings for a playback device. As shown in FIG. 2, a playback device 210 and a network device 230 are located in a room 201. The playback device 210 may be similar to any of the playback devices 110 depicted in FIGS. 1A-1E and 1G, and the network device 230 may be similar to any of the NMDs 120 or controllers 130 depicted in FIGS. 1A-1B and 1F-1H. One or both of the playback device 210 and the network device 230 are in communication, either directly or indirectly, with a computing device 206. The computing device 206 may be similar to any of the computing devices 106 depicted in FIG. 1B. For instance, the computing device 206 may be a server located remotely from the room 201 and connected to the playback device 210 and/or the network device 230 over a wired or wireless communication network.

In practice, the playback device 210 outputs audio content via one or more transducers (e.g., one or more speakers and/or speaker drivers) of the playback device 210. In one example, the audio content is output using a test signal or measurement signal representative of audio content that may be played by the playback device 210 during regular use by a user. Accordingly, the audio content may include content with frequencies substantially covering a renderable frequency range of the playback device 210 or a frequency range audible to a human. In one case, the audio content is output using an audio signal designed specifically for use when calibrating playback devices such as the playback device 210 being calibrated in examples discussed herein. In another case, the audio content is an audio track that is a favorite of a user of the playback device 210, or a commonly played audio track by the playback device 210. Other examples are also possible. In general, spectrally rich audio content may improve the results of calibration.

While the playback device 210 outputs the audio content, the network device 230 moves to various locations within the room 201. For instance, the network device 230 may move between a first physical location and a second physical location within the room 201. As shown in FIG. 2, the first physical location may be the point (a), and the second physical location may be the point (b). While moving from the first physical location (a) to the second physical location (b), the network device 230 may traverse locations within the room 201 where one or more listeners may experience audio playback during regular use of the playback device 210. For instance, as shown, the room 201 includes a kitchen area and a dining area, and a path 208 between the first physical location (a) and the second physical location (b) covers locations within the kitchen area and dining area where one or more listeners may experience audio playback during regular use of the playback device 210.

In some examples, movement of the network device 230 between the first physical location (a) and the second physical location (b) may be performed by a user. In one case, a graphical display of the network device 230 may provide an indication to move the network device 230 within the room 201. For instance, the graphical display may display text, such as “While audio is playing, please move the network device through locations within the playback zone where you or others may enjoy music.” Other examples are also possible.

The network device 230 determines an acoustic response of the room 201. To facilitate this, while the network device 230 is moving between physical locations within the room 201, the network device 230 captures audio data representing reflections of the audio content output by the playback device 210 in the room 201. For instance, the network device 230 may be a mobile device with a built-in microphone (e.g., microphone(s) 115 of network microphone device 120*a*), and the network device 230 may use the built-in microphone to capture the audio data representing reflections of the audio content at multiple locations within the room 201.

The multi-location acoustic response is an acoustic response of the room 201 based on the detected audio data representing reflections of the audio content at multiple locations in the room 201, such as at the first physical location (a) and the second physical location (b). The multi-location acoustic response may be represented as one or more of a spectral response, spatial response, and temporal response, among others. The spectral response may be an indication of how volume of audio sound captured by the microphone varies with frequency within the room 201. A power spectral density is an example representation of the spectral response. The spatial response may indicate how the volume of the audio sound captured by the microphone varies with direction and/or spatial position in the room 201. The temporal response may be an indication of how audio sound played by the playback device 210, e.g., an impulse sound or tone played by the playback device 210, changes within the room 201. The change may be characterized as a reverberation, delay, decay, or phase change of the audio sound.

The responses may be represented in various forms. For instance, the spatial response and temporal responses may be represented as room averages. Additionally, or alternatively, the acoustic response may be represented as a set of impulse responses or bi-quad filter coefficients representative of the acoustic response, among others. Values of the acoustic response may be represented in vector or matrix form.

Audio played by the playback device 210 is adjusted based on the acoustic response of the room 201 so as to offset or otherwise account for acoustics of the room 201 indicated by the acoustic response. In particular, the acoustic response is used to identify calibration settings, which may include determining an audio processing algorithm. U.S. Pat. No. 9,706,323, incorporated by reference above, discloses various audio processing algorithms, which are contemplated herein.

In some examples, determining the audio processing algorithm involves determining an audio processing algorithm that, when applied to the playback device 210, causes audio content output by the playback device 210 in the room 201 to have a target frequency response. For instance, determining the audio processing algorithm may involve determining frequency responses at the multiple locations traversed by the network device while moving within the room 201 and determining an audio processing algorithm that adjusts the frequency responses at those locations to more closely reflect target frequency responses. In one example, if one or more of the determined frequency responses has a particular audio frequency that is more attenuated than other frequencies, then determining the audio processing algorithm may involve determining an audio processing algorithm that increases amplification at the particular audio frequency. Other examples are possible as well.

In some examples, the audio processing algorithm takes the form of a filter or equalization. The filter or equalization may be applied by the playback device 210 (e.g., via audio processing components 112*g*). Alternatively, the filter or equalization may be applied by another playback device, the computing device 206, and/or the network device 230, which then provides audio content processed using the filter or equalization to the playback device 210 for output. The filter or equalization may be applied to audio content played by the playback device 210 until such time that the filter or equalization is changed or is no longer valid for the room 201.

The audio processing algorithm may be stored in a database of the computing device 206 or may be calculated dynamically. For instance, in some examples, the network device 230 sends to the computing device 206 the detected audio data representing reflections of the audio content at multiple locations in the room 201, and receives, from the computing device 206, the audio processing algorithm after the computing device 206 has determined the audio processing algorithm. In other examples, the network device 230 determines the audio processing algorithm based on the detected audio data representing reflections of the audio content at multiple locations in the room 201.

IV. Example Passive Speaker Authentication

In some scenarios, the calibration process described above may not be suitable for a particular playback device. For example, as described above in connection with FIG. 1A, some playback devices include an amplifier configured to drive one or more passive speakers external to the playback device via a corresponding wire or cable. An example of such a playback device is the CONNECT:AMP offered by Sonos, Inc. The speakers are referred to as passive speakers because they include no internal amplifier to drive the speaker drivers and are instead driven externally via an amplifier coupled to input terminals of the passive speaker.

The passive speakers may be a particular type of passive speakers and may have unknown audio characteristics. Without knowing the audio characteristics of the passive speakers, the playback device could damage the speakers when performing the calibration process. For instance, when the playback device outputs a calibration tone, as described above, through the passive speakers, the playback device could attempt to drive the passive speakers with an electrical current that exceeds the capabilities of, and thereby damages, the passive speakers.

One way to address these or other issues is to perform a passive speaker authentication process to identify a type of the passive speakers for purposes of determining whether the passive speakers are compatible with the calibration process and/or adjusting the calibration process to account for the audio characteristics of the passive speakers. Example techniques to perform a passive speaker authentication are described in further detail below.

Figure 3A:
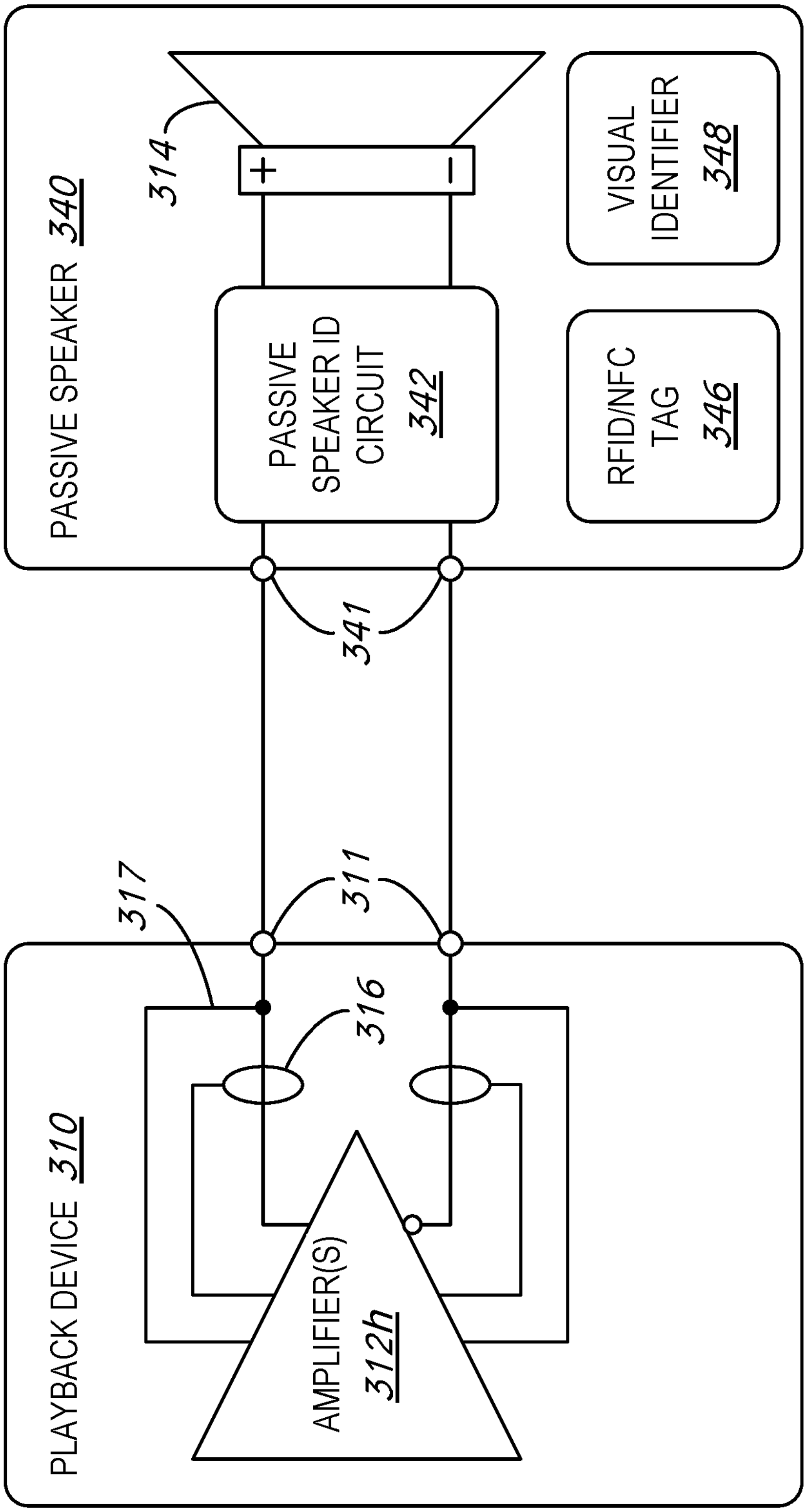
FIG. 3A is a block diagram of a playback device and a passive speaker.

FIG. 3A is a block diagram of a playback device 310 configured to drive a passive speaker 340 external to the playback device 310. As shown, the playback device 310 includes one or more output terminals 311 couplable to one or more input terminals 341 of the passive speaker. The output terminals 311 and/or the input terminals 341 may be similar to or the same as the input/output 111 described above in connection with FIG. 1C.

The passive speaker 340 includes one or more transducers 314, such as one or more speaker drivers, configured to receive audio signals and output the received audio signals as sound. The transducer(s) 314 may be similar to or the same as the transducers 114 described above in connection with FIG. 1C. The passive speaker 340 further includes a passive speaker identification circuit 342 for communicating one or more characteristics of the passive speaker 340 to the playback device 310, as described in further detail below. The components of the passive speaker 340, including the input terminals 341, the transducer(s) 314, and the passive speaker identification circuit 342, are carried in a housing of the passive speaker 340.

The playback device 310 further includes an audio stage having one or more audio amplifiers 312*h*, which may be similar to or the same as the amplifiers 112*h* described above in connection with FIG. 1C. The amplifier(s) 312*h* are configured to drive passive speakers connected to the output terminals 311. As shown, the amplifier(s) 312*h* are configured to drive the passive speaker 340. In particular, the amplifier(s) 312*h* are configured to drive the transducer(s) 314 of the passive speaker 340.

While not shown in FIG. 3A for simplification purposes, but as described above and shown in FIG. 1C, the playback device 310 further includes various electronics 112, including one or more processors 112*a* and a memory 112*b* storing program instructions that, when executed, cause the processor(s) 112*a* to perform some or all of the operations described herein. The playback device 310 further includes a housing that carries the output terminals 311, the audio stage (including the amplifiers 312*h*), and the electronics 112.

The amplifier(s) 312*h* may include one or more sensors, such as a current sensor 316 and/or a voltage sensor 317. The one or more sensors are coupled to an output of the amplifier(s) 312*h* and configured to sense an electrical current and voltage of the audio signal that the amplifier(s) 312*h* output when driving the passive speaker 340. Based on the values of electrical current and/or voltage measured by the current sensor 316 and/or the voltage sensor 317, the playback device 310 can determine various characteristics of the passive speaker 340.

The playback device 310 uses the measured current and/or voltage to determine that an input impedance of the passive speaker 340 has been modulated. As used herein, the term "modulate" and its various forms, when used to describe an impedance of the passive speaker 340, refers to a change of the impedance between two or more states. As such, modulating the impedance of the passive speaker 340 can include a single change of the impedance from one value to another, or multiple changes of the impedance, for example in a particular pattern for encoding data in a modulated signal, as described further below.

In some examples, the playback device 310 can determine that the measured current and/or voltage is a particular value (e.g., above or below a threshold value) or deviates from an expected value by a threshold amount and, responsive to making such a determination, the playback device 310 determines that the input impedance of the passive speaker 340 has been modulated. The playback device 310 can measure the current and/or voltage when outputting signals over a range of frequencies.

In some examples, the playback device 310 uses the measured current and/or voltage to detect a fault at the passive speaker 340 and to take remedial action. For instance, the playback device 310 can determine that the measured current exceeds a threshold value and, based on the determination, the playback device 310 can reduce the power of the output signal or stop outputting the signal altogether.

In some examples, the playback device 310 uses both the current sensor 316 and the voltage sensor 317 to measure the input impedance of the passive speaker 340. For instance, the playback device 310 can use the current sensor 316 and the voltage sensor 317 to measure the current and voltage of an output signal of the amplifier(s) 312*h* and, based on the measured current and voltage, determine the input impedance of the passive speaker 340 (e.g., using Ohm's law). In some examples, the playback device 310 measures the input impedance of the passive speaker 340 when outputting signals over a range of frequencies to determine an impedance curve of the passive speaker 340.

As noted above, in some examples, the amplifier(s) 312*h* drive the passive speaker 340 by outputting a calibration audio signal during a calibration process. And as further noted above, the amplifier(s) 312*h* may damage the passive speaker 340 if the calibration audio signal exceeds a current or power rating of the passive speaker 340. Accordingly, the passive speaker 340 includes one or more systems that the playback device 310 can interact with in order to determine various audio characteristics of the passive speaker 340.

As also noted above, the passive speaker 340 includes the passive speaker identification circuit 342 for communicating one or more characteristics of the passive speaker 340 to the playback device 310. As depicted, the passive speaker identification circuit is electrically coupled to the input terminals 341 and the transducer(s) 314 of the passive speaker 340.

In operation, the playback device 310 activates the passive speaker identification circuit 342 by outputting, via the amplifier(s) 312*h* and the output terminals 311, an identification signal to the input terminals 341 of the passive speaker 340. The identification signal can take various forms and can include an electrical signal having a particular frequency. In some examples, the particular frequency is a frequency that is generally considered inaudible to human ears (e.g., above 20,000 Hz or below 20 Hz), such that outputting the identification signal does not affect a user's listening experience. In other examples, the particular frequency is a frequency that is audible to human ears (e.g., between 20 Hz and 20,000 Hz), such that that transducer(s) 314 receive and convert the identification signal into an audible sound, thereby alerting the user that the playback device 310 is activating the passive speaker identification circuit 342.

Responsive to receiving the identification signal, the passive speaker identification circuit 342 communicates with the playback device 310, and, based on the communication, the playback device 310 identifies a type and/or one or more audio characteristics of the passive speaker 340.

Figure 3B:
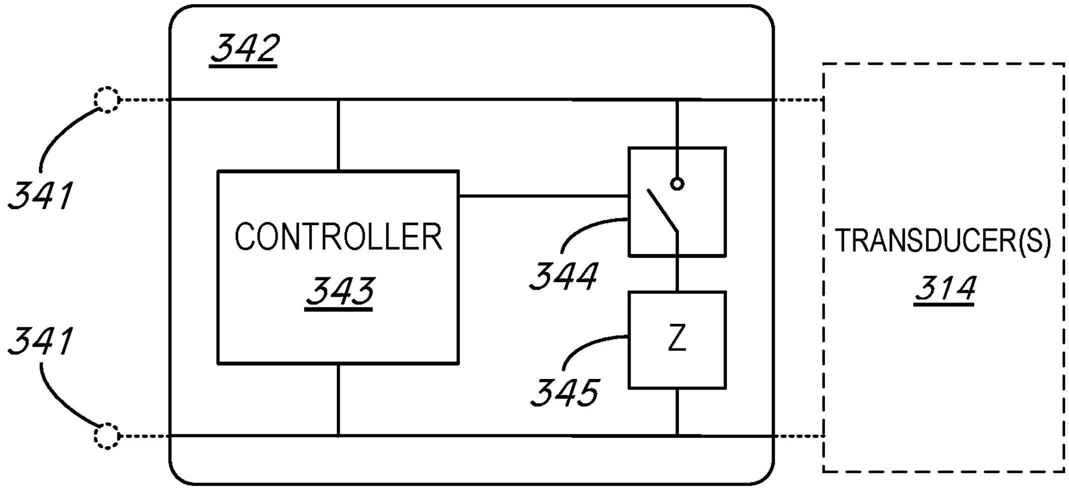
FIG. 3B is a block diagram of a passive speaker identification circuit.
Figure 3C:
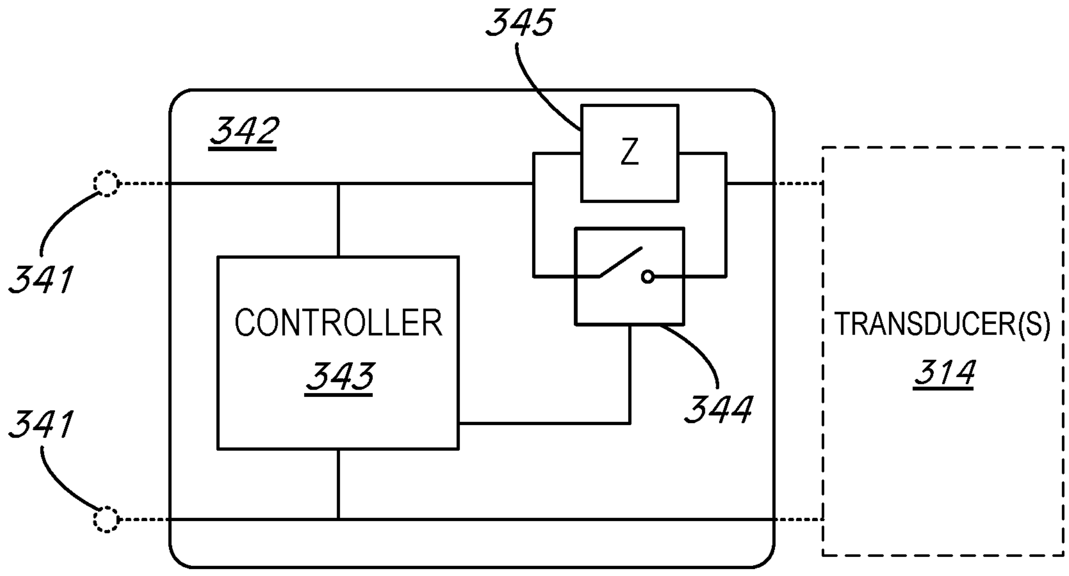
FIG. 3C is a block diagram of a passive speaker identification circuit.
Figure 3D:
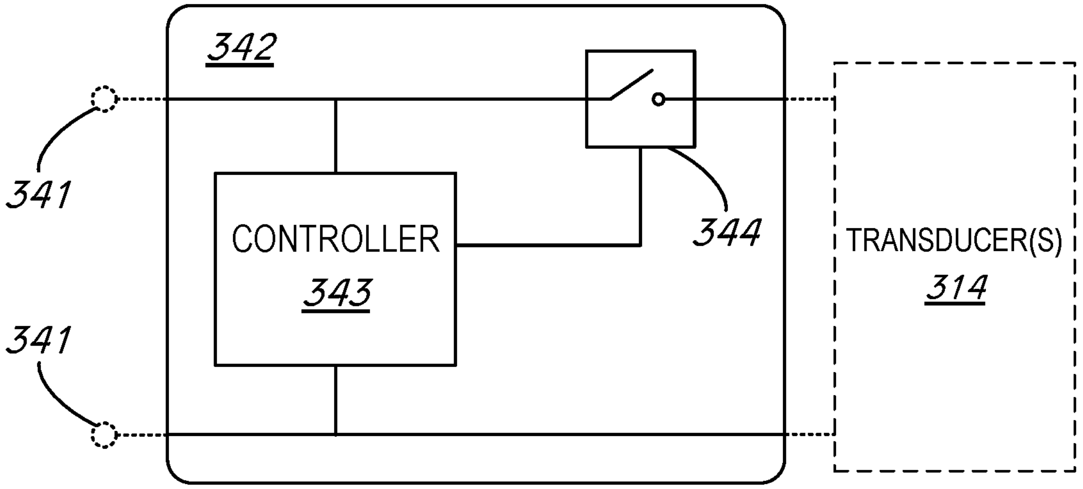
FIG. 3D is a block diagram of a passive speaker identification circuit.

FIGS. 3B, 3C, and 3D depict example configurations of the passive speaker identification circuit 342 for communicating with the playback device 310. In each of FIGS. 3B-3D, the passive speaker identification circuit 342 communicates with the playback device 310 by modulating an input impedance of the passive speaker 340 as seen by the playback device 310 at the input terminals 341 of the passive speaker 340.

Further, in each of FIGS. 3B-3D, the passive speaker identification circuit 342 includes a controller 343 and a switch 344 connected to the controller 343. The controller 343 is configured to modulate the input impedance of the passive speaker 340 by opening and closing the switch 344. The controller includes one or more processors as well as memory storing program instructions that when executed cause the one or more processors to carry out some or all of the functions described herein. In some examples, the controller 343 includes or takes the form of a microcontroller. Further, in some examples, the controller 343 includes an AC/DC converter configured to convert AC electrical signals received at the input terminals 341 into a DC electrical signal for powering the controller 343. In this manner, the passive speaker identification circuit 342 is powered by the playback device 310 and thus may operate without its own power source.

In FIG. 3B, the switch 344 is serially connected to a load 345, identified as Z. The switch 344 and the load 345 are further connected in parallel with the input terminals 341 and the transducer(s) 314. In this configuration, when the controller 343 causes the switch 344 to close, the load 345 is applied across the input terminals 341, thereby altering the input impedance of the passive speaker 340. Further, when the controller 343 causes the switch 344 to open, the load 345 is removed from the input terminals 341, thereby returning the input impedance of the passive speaker 340 to its previous value (i.e., returning to the input impedance of the transducer(s) 314 in combination with any other impedance sources connected to the input terminals 341).

In FIG. 3C, the switch 344 is connected in parallel with the load 345. The switch 344 and the load 345 are further connected in series between one of the input terminals 341 and the transducer(s) 314. In this configuration, when the controller 343 causes the switch 344 to open, the load 345 is applied in series between one of the input terminals 341 and the transducer(s) 314, thereby altering the input impedance of the passive speaker 340. Further, when the controller 343 causes the switch 344 to close, the switch 344 shorts the load 345, thereby returning the input impedance of the passive speaker 340 to its previous value (i.e., returning to the input impedance of the transducer(s) 314 in combination with any other impedance sources connected to the input terminals 341).

In FIG. 3D, the switch 344 is connected in series between one of the input terminals 341 and the transducer(s) 314, and the load 345 is excluded from the passive speaker identification circuit 342. In this configuration, when the controller 343 causes the switch 344 to open, the input impedance of the passive speaker 340 at the input terminals 341 appears as an open circuit (ignoring the impedance of any other impedance sources connected to the input terminals 341). Further, when the controller 343 causes the switch 344 to close, the input impedance of the passive speaker 340 returns to its previous value (i.e., returns to the input impedance of the transducer(s) 314 in combination with any other impedance sources connected to the input terminals 341).

Accordingly, in each of the configurations depicted in FIGS. 3B, 3C, and 3D, the controller 343 modulates the input impedance of the passive speaker 340 by opening and/or closing the switch 344. Further, as noted above, the controller 343 can modulate the input impedance of the passive speaker 340 in various ways in order to communicate information to the playback device 310.

In some examples, the controller 343 modulates the input impedance of the passive speaker 340 by causing the input impedance to vary more significantly at one or more particular frequencies than at others. In these examples, the playback device 310 can determine the value of the one or more particular frequencies and, based on the determination, identify various characteristics of the passive speaker 340. An example of this process is described as follows in connection with FIGS. 4A-4C.

Figure 4A:
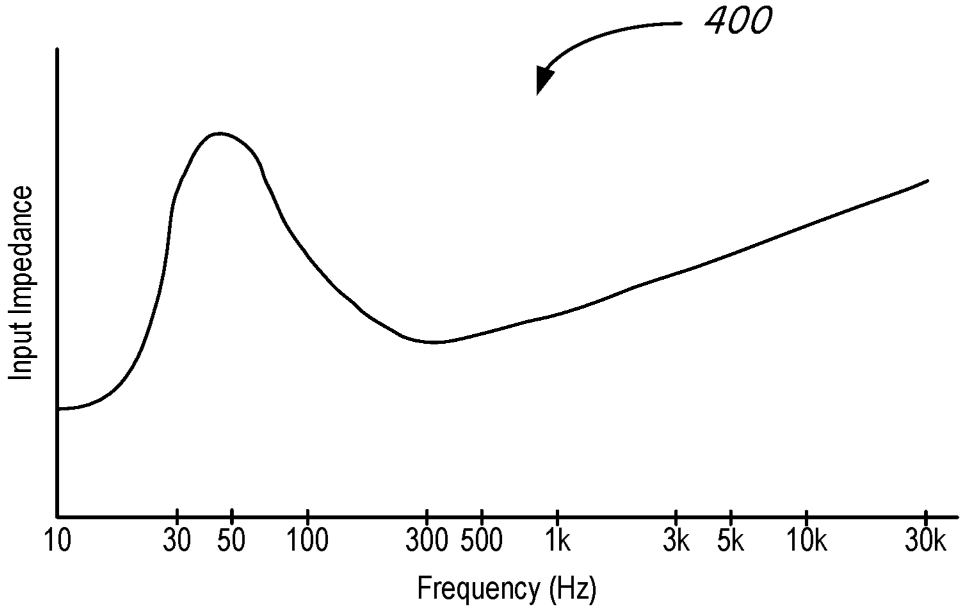
FIG. 4A is an impedance curve of a passive speaker.

FIG. 4A is an example of an input impedance curve 400 of the passive speaker 340. The impedance curve 400 represents the unmodulated input impedance of the passive speaker 340 over a range of frequencies from 10 Hz to 30 kHz. In line with the discussion above, the playback device 310 activates the passive speaker identification circuit 342, and the passive speaker identification circuit 342 responsively modulates the input impedance of the passive speaker 340.

Figure 4B:
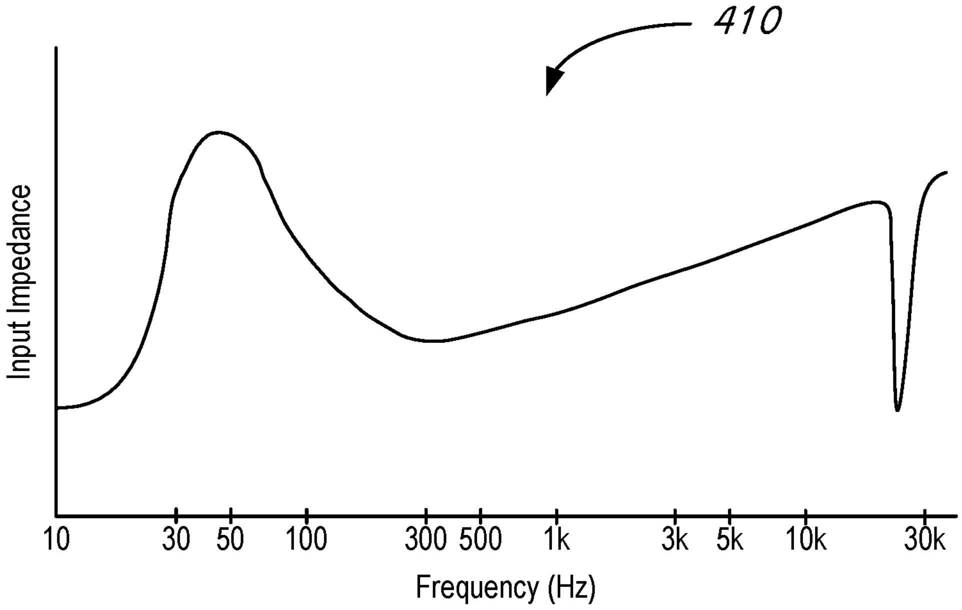
FIG. 4B is an impedance curve of a passive speaker.

FIG. 4B is an example of an input impedance curve 410 of the passive speaker 340 while the passive speaker identification circuit 342 modulates the input impedance. As shown, the modulated input impedance curve 410 shows that the input impedance of the passive speaker 340 has been reduced for frequencies at or around 25 kHz.

In order to modulate the input impedance as shown in FIG. 4B, the passive speaker identification circuit 342 can connect or disconnect the load 345 to or from the input terminals 341 and/or the transducer(s) 314 as described above in connection with FIGS. 3B and 3C. For instance, in some examples, the load 345 includes an LCR circuit having a resonant frequency, such that connecting or disconnecting the load 345 to or from the input terminals 341 and/or the transducer(s) 314 modulates the input impedance of the passive speaker 340 more significantly at the resonant frequency than at other frequencies. With respect to FIG. 4B, the load 345 includes an LCR circuit having a resonant frequency of 25 kHz, and controller 343 of the passive speaker identification circuit 342 modulates the input impedance of the passive speaker 340 by switching the load 345 in parallel with the transducer(s) 314, as described above in connection with FIG. 3B. Other examples are possible as well.

The passive speaker identification circuit 342 is configured to modulate the input impedance of the passive speaker 340 in a particular manner that depends on a type of the passive speaker 340. As such, the playback device 310 determines the type of the passive speaker 340 based on the particular manner in which the passive speaker identification circuit 342 modulates the input impedance of the passive speaker 340.

In some examples, the passive speaker identification circuit 342 modulates the input impedance of the passive speaker 340 more significantly at a particular frequency (referred to herein as the "key frequency") than at other frequencies, and the value of the key frequency is based on the type of the passive speaker 340. In these examples, the playback device 310 determines the value of the key frequency and, based on the determined value of the key frequency, identifies one or more characteristics of the passive speaker 340.

In order to determine the value of the key frequency, the playback device 310 outputs a series of identification tones at respective frequencies. In some examples, outputting the series of identification tones involves the playback device 310 performing a frequency sweep by outputting identification tones over a range of frequencies. The playback device 310 uses the current sensor 316 and/or the voltage sensor 317 of the amplifier(s) 312*h* to measure the output current and/or voltage for each respective identification tone frequency. The playback device 310 can then determine the key frequency to be whichever identification tone frequency corresponds to a measured current or voltage (or a measured impedance determined based on the measured current and voltage) that is above or below a threshold value or that differs from one or more other measured values by a threshold amount.

Referring to FIG. 4B, for instance, the playback device 310 can measure the current and/or voltage of a series of identification tones, including a 25 kHz identification tone. Because the passive speaker identification circuit 342 modulated the input impedance of the passive speaker for 25 kHz signals, the output current and/or voltage measured by the playback device 310 while outputting the 25 kHz identification tone is also modulated. As shown, the passive speaker identification circuit 342 reduced the input impedance of the passive speaker 340 for 25 kHz signals, such that the output current, for instance, measured by the playback device 310 is increased while outputting the 25 kHz identification tone. As such, the playback device 310 can determine that the key frequency is 25 kHz based on the measured current of the 25 kHz identification tone exceeding a threshold current value or deviating from an expected current value by a threshold amount.

Other examples are possible as well. For instance, in some examples, the passive speaker identification circuit 342 modulates the input impedance of the passive speaker by increasing the input impedance. Further, in some examples, the playback device 310 determines the key frequency based on the measured output voltage and/or a measured impedance (e.g., based on the measured output current and voltage).

Once the playback device 310 determines the key frequency, the playback device 310 identifies one or more characteristics of the passive speaker 340 based on the key frequency. In some examples, the playback device 310 accesses a database that stores sets of speaker identification data, each set associated with a particular key frequency.

FIG. 4C is a simplified diagram of an example database 420 that stores speaker identification data associated with key frequencies. The database 420 can be stored in a memory of the playback device 310 or of some other computing device (e.g., a network server) in communication with the playback device 310, so that the playback device 310 can access and retrieve data from the database 420.

As shown in FIG. 4C, the database 420 includes various sets of speaker identification data labeled as "DATA 1," "DATA 2," "DATA 3," "DATA 4," and "DATA 5." Each set of speaker identification data is associated with a respective key frequency. FIG. 4C shows the key frequencies as 25 kHz, 30 kHz, 35 kHz, 40 kHz, and 45 kHz. In other examples, the database 420 can include additional or fewer key frequencies and/or key frequencies of different values.

Once the playback device 310 determines the key frequency of the passive speaker 340, the playback device 310 accesses the database 420 and retrieves the speaker identification data associated with the determined key frequency. With regard to FIG. 4B, the playback device 310 determines the key frequency to be 25 kHz, as described above. Accordingly, the playback device 310 accesses the database 420 and retrieves the speaker identification data associated with the 25 kHz key frequency, which in this case is DATA 1.

The speaker identification data stored in the database 420 can include various types of speaker identification data indicative of one or more characteristics of the passive speaker 340. In some examples, the speaker identification data includes one or more of (i) data representing a manufacturer of the passive speaker 340, (ii) data representing a model number of the passive speaker 340, (iii) data representing a serial number of the passive speaker 340, (iv) data representing a physical appearance of the passive speaker 340, (v) data representing peak voltage or current limits of the passive speaker 340, (vi) data representing the impedance of the passive speaker 340 at one or more frequencies, or (vii) data representing a thermal response of the passive speaker 340.

Using the speaker identification data associated with the key frequency of the passive speaker 340, the playback device 310 determines whether the passive speaker 340 is compatible with a calibration process, such as the calibration process described above, and/or the playback device 310 adjusts the calibration process to account for the audio characteristics of the passive speaker 340. As an example, certain manufacturers may be known to manufacture passive speakers that are compatible with the calibration process, and the playback device 310 can use the speaker identification data to determine that the passive speaker 340 is manufactured by one of those compatible manufacturers. As another example, certain models of passive speakers may be known to be compatible with the calibration process, and the playback device 310 can use the speaker identification data to determine that the passive speaker 340 is one of those compatible models. As yet another example, the calibration process may involve the playback device 310 outputting calibration tones at known frequencies, currents, voltages, and/or power levels, and the playback device 310 can use the speaker identification data to determine that the output calibration tones will not exceed a peak voltage or current limit of the passive speaker 340, or that the calibration tones will not cause thermal failure of the passive speaker 340, and that the passive speaker 340 is therefore compatible with the calibration process. Other examples are possible as well.

In addition to, or in the alternative to, modulating the input impedance of the passive speaker 340 at the key frequency, in some examples, the passive speaker identification circuit 342 modulates the input impedance of the passive speaker 340 in a particular pattern, where the pattern corresponds to the type of the passive speaker 340. As such, the playback device 310 can determine the pattern at which the passive speaker identification circuit 342 modulates the impedance and, based on the determined pattern, determine the type of the passive speaker 340.

As an example, the passive speaker identification circuit 342 can modulate the input impedance of the passive speaker 340 in a pattern to encode data (e.g., the speaker identification data described above in connection with the database 420) in a signal at the input terminal(s) 341. The speaker identification data can be stored in a memory of the controller 343, and the controller 343 can communicate the data to the playback device 310 in various ways. For instance, while the passive speaker identification circuit 342 is active (e.g., while the playback device 310 outputs the identification signal), the controller 343 can toggle the switch 344 to communicate a binary digital signal to the playback device 310.

In particular, when the switch 344 is in a first state (i.e., open or closed), the playback device 310 measures a first current, voltage, or impedance and attributes a "0" to the first measured value, and when the controller 343 toggles the switch 344 to a second state, the playback device 310 measures a second current, voltage, or impedance and attributes a "1" to the second measured value. In this manner, the passive speaker identification circuit 342 can communicate the speaker identification data to the playback device 310 by toggling the switch 344 open and closed. And, as noted above, the playback device 310 can use the speaker identification data to determine whether the passive speaker 340 is compatible with the calibration process.

In some examples, the passive speaker identification circuit 342 communicates information to the playback device 310 in other ways. For instance, instead of using the switch 344 to apply or remove the load 345 to or from the circuitry of the passive speaker 340, the passive speaker identification circuit 342 can be configured such that the load 345 is persistently connected to the circuitry of the passive speaker 340.

Figure 3E:
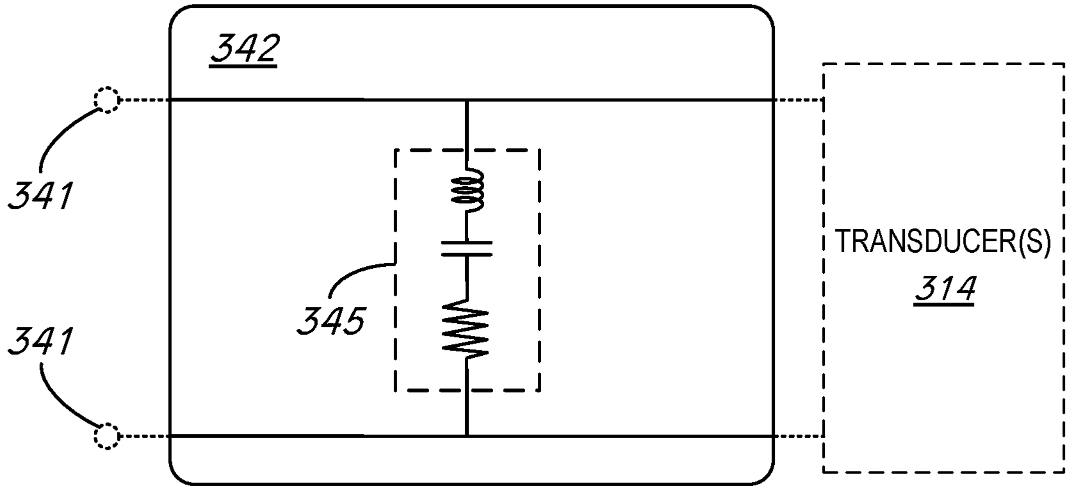
FIG. 3E is a block diagram of a passive speaker identification circuit.
Figure 3F:
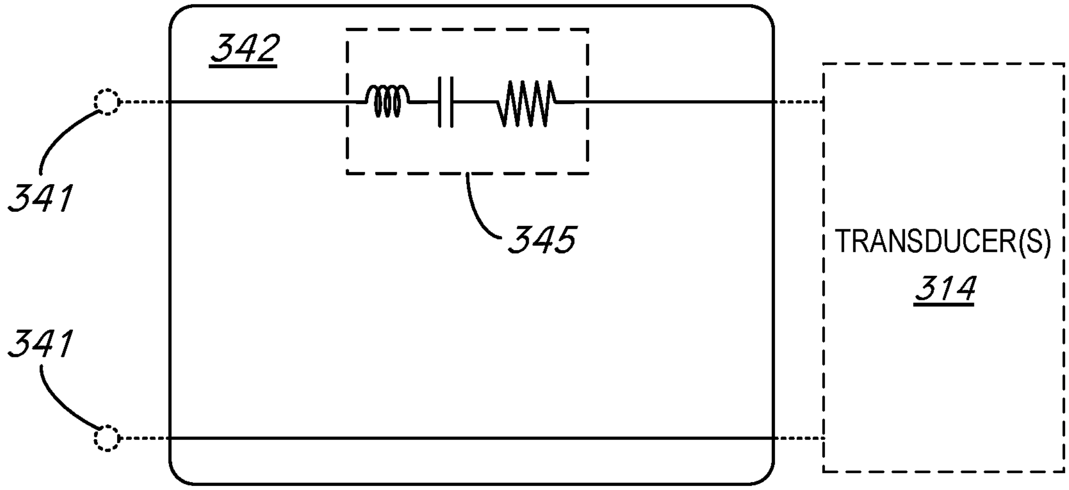
FIG. 3F is a block diagram of a passive speaker identification circuit.

FIG. 3E depicts an example passive speaker identification circuit 342 in which the load 345 is persistently connected in parallel with the transducer(s) 314, and FIG. 3F depicts an example passive speaker identification circuit 342 in which the load 345 is persistently connected in series with the transducer(s) 314.

With respect to FIGS. 3E and 3F, the load 345 may have a resonant frequency at which the impedance of the load 345 is a minimum impedance. For instance, as shown, the load 345 is an LCR circuit, which has a resonant frequency of $f=1/2\pi\sqrt{LC}$. The playback device 310 can output a series of identification tones, for instance, by performing a frequency sweep over a range of frequencies, and, in line with the discussion above, the playback device 310 can measure a current and/or voltage of the identification tones to determine the resonant frequency of the load 345.

In one example, the playback device 310 outputs the identification tones at a constant voltage and measures respective currents of the identification tones. Responsive to measuring a threshold high increase in current, or a maximum current, while outputting a particular identification tone, the playback device 310 can determine that the frequency of the particular identification tone is the resonant frequency of the load 345. In another example, the playback device 310 outputs the identification tones at a constant current and measures respective voltages of the identification tones. Responsive to measuring a threshold high decrease in voltage, or a minimum voltage, while outputting a particular identification tone, the playback device 310 can determine that the frequency of the particular identification tone is the resonant frequency of the load 345. In yet another example, the playback device 310 can measure both the current and voltage of the respective identification tones in order to determine an impedance of the passive speaker 340 (e.g., using Ohm's law). Responsive to determining that a particular identification tone results in a threshold low determined impedance, or a minimum impedance, the playback device 310 can determine that the frequency of the particular identification tone is the resonant frequency of the load 345.

In any case, as described above, the playback device 310 determines speaker identification data, for instance by accessing the database 420 and retrieving, from the database 420, speaker identification data associated with the determined resonant frequency of the load 345. Based on the speaker identification data, the playback device 310 determines whether the passive speaker 340 is compatible with a calibration process, such as the calibration process described above, and/or the playback device 310 adjusts the calibration process to account for the audio characteristics of the passive speaker 340.

For each of the passive speaker identification circuits 342 depicted in FIGS. 3A-3F, in order for the playback device 310 to more accurately detect the impedance modulation and/or the resonant frequency of the passive speaker 340, the playback device 310 can be configured to identify and ignore erroneous effects on the measured current and/or voltage that may appear to be caused by an impedance modulation of the passive speaker 340, but are instead caused by one or more other factors. For instance, various lengths of speaker wire can be used to connect the passive speaker 340 to the playback device 310, which results in parasitic inductance, capacitance, and resistance that can affect the impedance curve of the passive speaker 340. Similarly, part tolerances for various components of the passive speaker 340, including the passive speaker identification circuit 342, can also affect the impedance curve. Because these factors affect the impedance curve of the passive speaker 340, and therefore also affect the current and/or voltage measured by the current sensor 316 and/or voltage sensor 317, these factors can, in some circumstances, cause the playback device 310 to falsely determine that the passive speaker identification circuit 342 is modulating the impedance of the passive speaker 340 and, therefore, erroneously authenticate the passive speaker 340.

To facilitate identifying and ignoring erroneous effects on the measured current and/or voltage that are not caused by the passive speaker identification circuit 342 modulating the impedance of the passive speaker 340, the playback device 310 can reference current and/or voltage data profiles corresponding to these erroneous effects, and, based on a measured current and/or voltage matching one of the referenced data profiles, determine that the measured current and/or voltage results from the corresponding erroneous effect rather than from the passive speaker identification circuit 342 modulating the impedance of the passive speaker 340.

The data profiles corresponding to the erroneous effects can be generated in various ways. In some examples, the data profiles are generated based on circuit models of the playback device 310 and the passive speaker 340. For instance, a circuit model can include models of the amplifier(s) 312*h*, the passive speaker identification circuit 342, the transducer(s) 314, and the parasitic inductance, capacitance, and resistance from the speaker wires, the output terminals 311, and input terminals 341. In other examples, the circuit model can include models of additional or fewer components, as well as of any other components that may be present in the playback device 310 and the passive speaker 340.

The circuit model can be used to predict how variations in inductances, capacitances, and resistances of the modeled components affect the values of the current and/or voltage measured by the playback device 310. For instance, the circuit model can be simulated for a number of different inductances, capacitances, and resistances corresponding to a number of different speaker wire lengths, part tolerances, number of passive speakers, or the like. Each simulation calculates the current at the current sensor 316 over a range of frequencies.

The playback device 310 can be configured to analyze the simulated current values to determine behavior patterns of the current. For instance, the playback device 310 can compare simulated current values for multiple simulations corresponding to different speaker wire lengths and, based on the values of the current, determine how the current changes as the speaker wire length changes. The playback device 310 can determine similar current behavior patterns corresponding to other variations (e.g., part tolerances or number of speakers) in the circuit model as well.

When authenticating the passive speaker 340, the playback device 310 can then reference the determined behavior patterns of the current to more accurately detect the impedance modulation of the passive speaker 340. For instance, the playback device 310 can use the current sensor 316 to measure an electrical current that appears to correspond to the passive speaker identification circuit 342 modulating the impedance of the passive speaker 340. In order to confirm whether the measured electrical current corresponds to the passive speaker identification circuit 342 modulating the impedance of the passive speaker 340, the playback device 310 can compare the measured current to the determined behavior patterns (e.g., by referencing a local database of the playback device 310 or a database of a network device in communication with the playback device 310).

If the measured current exhibits characteristics substantially similar to, or the same as, one or more of the determined behavior patterns, then the playback device 310 can determine that the passive speaker identification circuit 342 is not modulating the impedance of the passive speaker 340. On the other hand, if the measured current exhibits characteristics that are not substantially similar to, or the same as, one or more of the determined behavior patterns, then the playback device 310 can determine that the passive speaker identification circuit 342 is modulating the impedance of the passive speaker 340. In this manner, the playback device 310 can reduce the number of false authentications by identifying and ignoring erroneous effects on the measured current that are not caused by the passive speaker identification circuit 342 modulating the impedance of the passive speaker 340.

In some examples, the playback device 310 determines that the passive speaker 340 is not compatible with the calibration process. For instance, the playback device 310 can determine, based on the speaker identification data obtained from the database 420 or from the passive speaker 340, that the calibration process involves outputting one or more calibration tones at current, voltage, and/or power levels that exceed the capabilities of the passive speaker 340. Responsive to making such a determination, the playback device 310 adjusts the calibration process so that the playback device 310 outputs the calibration tones at reduced current, voltage, and/or power levels that are within the capabilities of the passive speaker 340.

Once the playback device 310 determines that the passive speaker 340 is compatible with the calibration process or once the playback device 310 has adjusted the calibration process to make the calibration process compatible with the passive speaker 340, the playback device 310 can set a state variable of the playback device 310 to reflect the determined compatibility. For instance, prior to determining the calibration compatibility of the passive speaker 340, the playback device 310 sets the state variable to a default state that indicates that the passive speaker 340 has not been determined to be compatible with the calibration process. And responsive to determining that the passive speaker 340 is compatible with the calibration process, the playback device 310 alters the state variable to an authenticated state that indicates that the passive speaker 340 has been determined to be compatible.

As such, prior to performing the calibration process, the playback device 310 can check the state of the state variable. Responsive to determining that the state variable is in the authenticated state, the playback device 310 proceeds to perform the calibration process. And responsive to determining that the state variable is in the default state, the playback device 310 does not perform the calibration process.

After authenticating the passive speaker 340 for calibration and setting the state variable to the authenticated state, the playback device 310 can be further configured to revert the state variable back to the default state in certain circumstances. As an example, the playback device 310 can be configured to set the state variable to the default state when powering on, as a different speaker that has not yet been authenticated for calibration could be connected to the playback device 310 while the playback device is powered off. As another example, the playback device 310 can be configured to set the state variable to the default state upon detecting that the passive speaker 340 has been disconnected from the playback device 310, as a different passive speaker that has not yet been authenticated for calibration could subsequently be connected to the playback device 310.

The playback device 310 can determine that the passive speaker 340 has been disconnected in various ways. In some examples, the playback device 310 determines that the passive speaker 340 has been disconnected responsive to detecting an open circuit (e.g., using the current sensor 316 and/or voltage sensor 317) at the output terminals 311. Other examples are possible as well.

Referring back to FIG. 3A, the passive speaker 340 can additionally or alternatively include one or more other components for determining whether the calibration process is compatible with the passive speaker 340. As shown, the passive speaker 340 includes a radio frequency identification (RFID) or near-field communication (NFC) tag 346 and/or a scannable identifier 348. The playback device 310 and/or another computing device, such as a control device (e.g., control device 130*a* in FIGS. 1A, 1B, and 1H) can interact with the tag 346 and/or the scannable identifier 348 to determine the type of the passive speaker 340.

In some examples, the speaker identification data (e.g., the speaker identification data described above in connection with database 420) is stored in a memory of the tag 346. The playback device 310 or the control device queries the tag 346 according to a particular RFID or NFC protocol (e.g., Bluetooth or Bluetooth Low Energy) in order to obtain the speaker identification data. Responsive to obtaining the speaker identification data, the playback device 310 or the control device determines the type of the passive speaker 340 and whether the calibration process is compatible with the passive speaker 340, as described above.

The scannable identifier 348 can take various forms, including a Quick Response (QR) code, a barcode, or the like. The scannable identifier 348 can be encoded with the speaker identification data or with an address (e.g., a URL) of a location where the speaker identification data is stored. As such, the control device scans the scannable identifier 348, for instance using a camera of the control device, in order to directly or indirectly obtain the speaker identification data. Responsive to obtaining the speaker identification data, the control device determines the type of the passive speaker 340 and whether the calibration process is compatible with the passive speaker 340, as described above.

In order to facilitate the control device scanning the scannable identifier 348, the scannable identifier 348 is positioned on an outer surface of the housing of the passive speaker 340. For instance, the scannable identifier 348 can be located on a back side or underside of the passive speaker 340 so that the identifier 348 is out of sight during normal use, but can be scanned by the control device without removing or opening the housing of the passive speaker 340.

In any case, once the playback device 310 determines that the passive speaker 340 is compatible with the calibration process and/or once the playback device 310 adjusts the calibration process to be compatible with the passive speaker 340, the playback device 310 performs the calibration process. In particular, the playback device 310 performs the calibration process described above to determine and account for an acoustic response of a room in which the playback device 310 and the passive speaker 340 are located. Based on the acoustic response of the room, the playback device 310 identifies an audio processing algorithm that, when applied to the playback device 310, results in audio content output by the passive speaker 340 having a target audio characteristic, such as a target frequency response, at one or more locations in the room. And after performing the calibration process, the playback device 310 outputs, via the passive speaker 340, second audio content using the applied audio processing algorithm.

While the above examples are described for a single passive speaker 340 connected to the playback device 310, other examples can include multiple passive speakers connected to the playback device 310. For instance, two passive speakers can be connected to respective output terminals of the playback device 310, and the playback device 310 can drive the two passive speakers as a stereo pair by driving one of the passive speakers with left channel audio and the other with right channel audio. Other example passive speaker configurations are possible as well. In any case, the playback device 310 can perform the above authentication process for each connected passive speaker, sequentially or concurrently.

Figure 5:
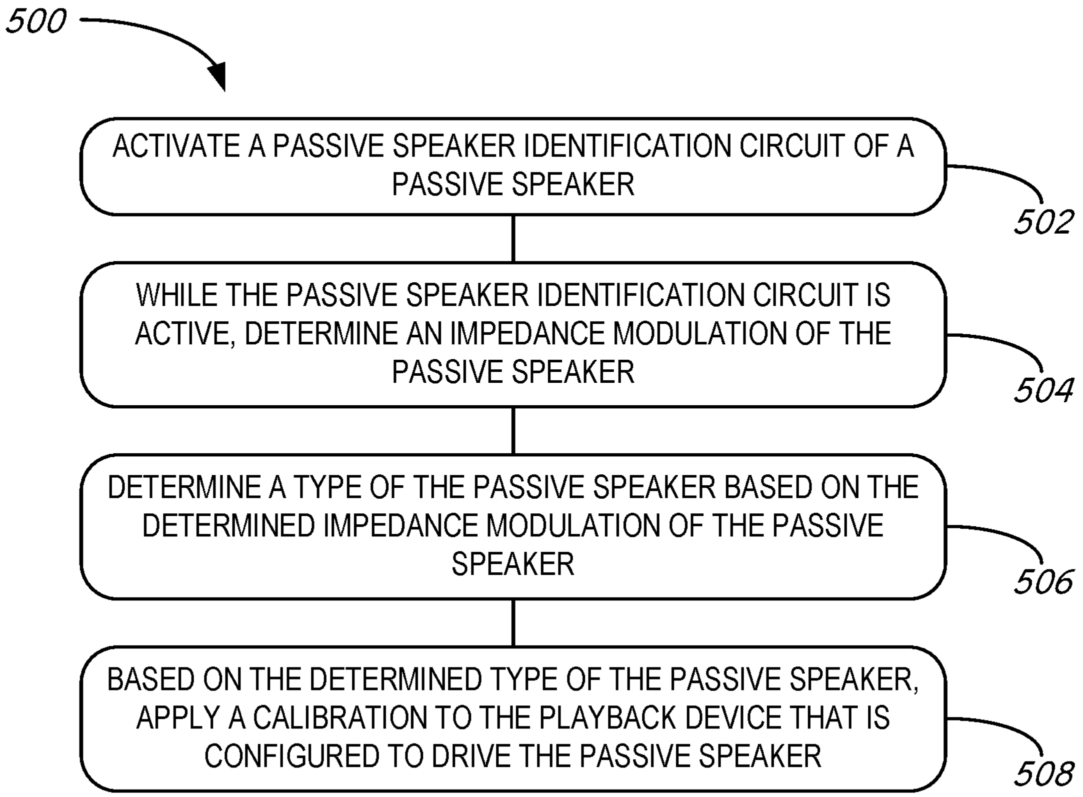
FIG. 5 is a flowchart of a method for authenticating a passive speaker to enable calibration of a playback device.

FIG. 5 shows an example method 500 for authenticating a passive speaker to enable calibration of a playback device. Method 500 can be implemented by any of the playback devices disclosed and/or described herein, or any other playback device now known or later developed.

Various embodiments of method 500 include one or more operations, functions, and actions illustrated by blocks 502 through 508. Although the blocks are illustrated in sequential order, when possible, these blocks may also be performed in parallel, and/or in a different order than the order disclosed and described herein. Also, the various blocks may be combined into fewer blocks, divided into additional blocks, and/or removed based upon a desired implementation.

In addition, for the method 500 and for other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and for other processes and methods disclosed herein, each block in FIG. 5 may represent circuitry that is wired to perform the specific logical functions in the process.

Method 500 begins at block 502, which involves the playback device activating a passive speaker identification circuit of the passive speaker. In line with the discussion above, the playback device includes one or more output terminals coupled to an input terminal of the passive speaker. The playback device further includes an audio stage having one or more audio amplifiers configured to drive the passive speaker. As such, activating the passive speaker identification circuit of the passive speaker involves outputting, via the one or more audio amplifiers and the one or more output terminals of the playback device, an identification signal to the input terminal of the passive speaker.

At block 504, method 500 involves, while the passive speaker identification circuit is active, the playback device determining an impedance modulation of the passive speaker. In line with the discussion above, determining the impedance modulation of the passive speaker involves using a current sensor of the playback device to measure an electrical current of the identification signal and, based on the measured electrical current of the identification signal, determining that the passive speaker identification circuit is modulating the impedance of the passive speaker.

At block 506, method 500 involves the playback device determining a type of the passive speaker based on the determined impedance modulation of the passive speaker. In line with the discussion above, the playback device can determine that the passive speaker is a particular type of passive speaker based on the passive speaker impedance being modulated more significantly at a particular frequency than at others or based on the impedance being modulated according to a particular pattern.

At block 508, method 500 involves, based on the determined type of the passive speaker, applying a calibration to the playback device. In line with the discussion above, applying the calibration to the playback device can involve adjusting a calibration process based on the determined type of the passive speaker. Additionally or alternatively, applying the calibration to the playback device can involve performing the calibration process to identify an audio processing algorithm that, when applied to the playback device, results in audio content output by the passive speaker having a target audio characteristic, such as a target frequency response, at one or more locations in an environment of the passive speaker.

In some examples, the passive speaker identification circuit includes a serial LCR circuit in parallel to one or more speaker drivers of the passive speaker. In these examples, outputting the identification signal to the input terminal of the passive speaker involves outputting a series of identification tones at respective frequencies, and measuring the electrical current of the identification signal involves measuring electrical currents corresponding to each identification tone. Further, determining the impedance modulation of the passive speaker involves determining that a particular identification tone caused a particular change in the measured electrical current. Still further, determining the particular type of the passive speaker based on the determined impedance modulation of the passive speaker involves determining a particular type of the passive speaker that corresponds to the particular identification tone.

In some examples, the passive speaker identification circuit includes a controller, and outputting the identification signal to the input terminal of the passive speaker involves outputting the identification signal to power the controller. The controller, when powered, modulates the impedance of the passive speaker in a particular pattern corresponding to the particular type of the passive speaker. Measuring the electrical current of the identification signal involves measuring the electrical current of the identification signal while the controller modulates the impedance of the passive speaker in the particular pattern corresponding to the particular type of the passive speaker. Determining the impedance modulation of the passive speaker involves determining, based on the measured electrical current of the identification signal, the particular pattern. And determining the particular type of the passive speaker based on the determined impedance modulation of the passive speaker involves determining a particular type of the passive speaker that corresponds to the particular pattern.

In some examples, the passive speaker identification circuit includes at least one of (i) a parallel impedance in parallel with the one or more speaker drivers of the passive speaker, (ii) a series impedance in series with the one or more speaker drivers, or (iii) a switch in series with the one or more speaker drivers. Accordingly, in these examples, modulating the impedance of the passive speaker in the particular pattern corresponding to the particular type of the passive speaker involves, respectively, (i) switching the parallel impedance in parallel with the one or more speaker drivers according to the particular pattern, (ii) switching the series impedance in series with the one or more speaker drivers according to the particular pattern, or (iii) switching the switch in series with the one or more speaker drivers according to the particular pattern.

In some examples, the passive speaker identification circuit further comprises data storage having stored thereon speaker identification data that includes at least one of (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing the impedance of the passive speaker at one or more frequencies, or (vii) data representing a thermal response of the passive speaker. In these examples, modulating the impedance of the passive speaker in the particular pattern corresponding to the particular type of the passive speaker involves modulating the impedance of the passive speaker in a particular pattern corresponding to the speaker identification data. Further, determining the particular type of the passive speaker based on the determined impedance modulation of the passive speaker involves determining the speaker identification data based on the impedance of the passive speaker being modulated in the particular pattern corresponding to the speaker identification data.

While the above examples provide useful ways of identifying a passive speaker for purposes of determining whether a calibration process can be performed for the passive speaker, the above examples are not without drawbacks. For instance, as described above (and shown in FIGS. 3E and 3F), one way of identifying the passive speaker involves incorporating a persistently connected LCR circuit into the passive speaker to modulate the input impedance of the passive speaker (e.g., relative to the input impedance of a passive speaker without the LCR circuit) at a particular resonant frequency that corresponds to the type of speaker. While such an approach is both effective and inexpensive to implement (e.g., the cost of incorporating the additional LCR circuit into the passive speaker is minimal), this can result in a limited number of identifiable passive speakers at least because the playback device may be physically limited with respect to the range of resonant frequencies that the playback device can identify. Further, within that range, the identifiable resonant frequencies should be spaced apart sufficiently so that the playback device can distinguish between the resonant frequencies and avoid misidentifying the passive speaker.

Figure 6:
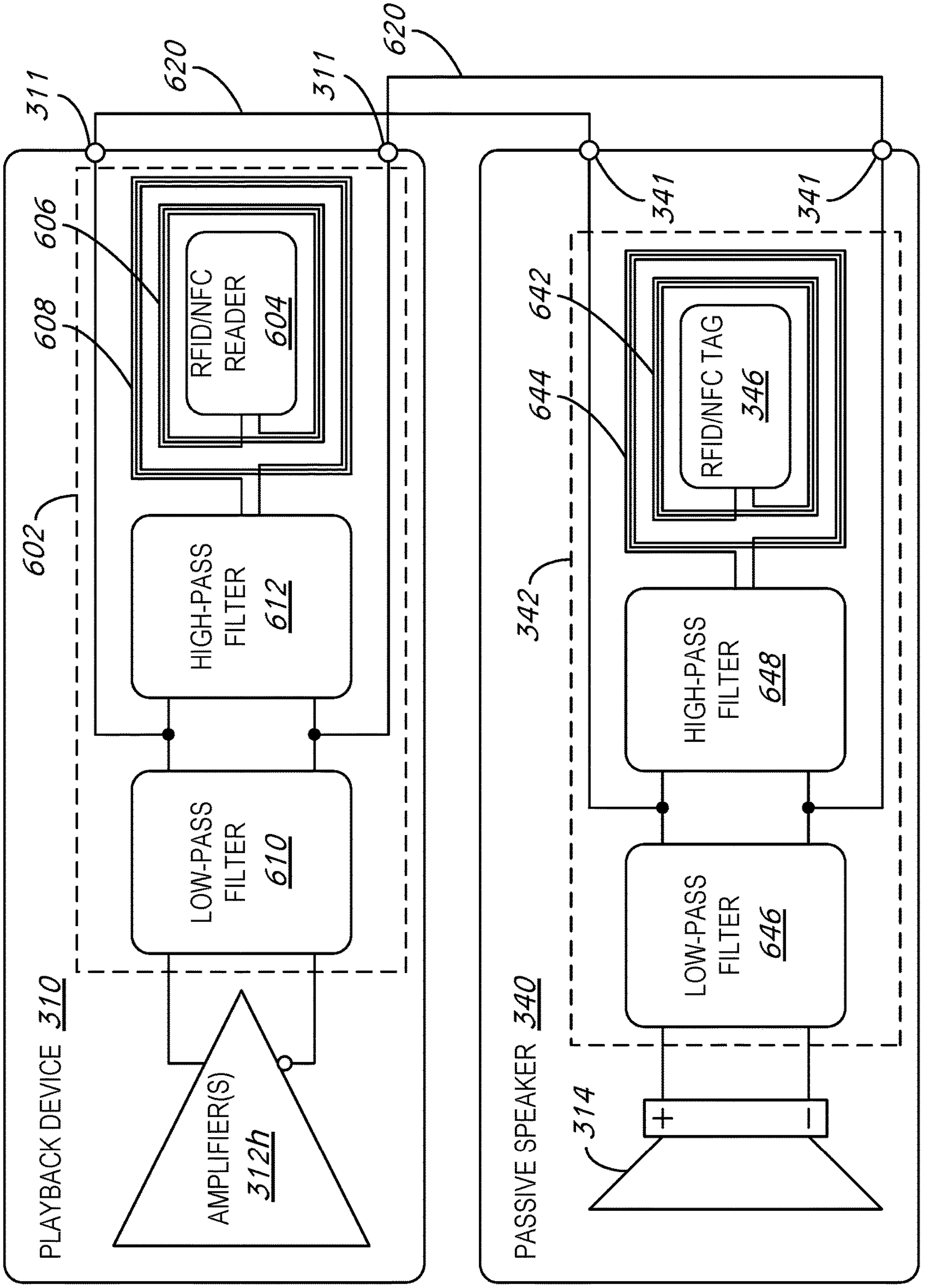
FIG. 6 is a block diagram of a playback device and a passive speaker.

FIG. 6 illustrates a block diagram of an alternative configuration of the playback device 310 and the passive speaker 340 that may help address the drawbacks identified above. In this example, the playback device 310 and the passive speaker 340 include many of the same features identified above in connection with FIG. 3A. For instance, the playback device 310 includes an audio stage having one or more audio amplifiers 312*h*, and the playback device 310 includes one or more output terminals 311. The output terminal(s) 311 are couplable to one or more input terminals 341 of the passive speaker 340, such as via speaker wire 620, and the amplifier(s) 312*h* are configured to drive the passive speaker 340 by outputting audio signals through the output terminal(s) 311 of the playback device 310, along the speaker wire 620, and through the input terminal(s) 341 of the passive speaker 340. Again, while not shown in FIG. 6 for simplification purposes, but as described above and shown in FIG. 1C, the playback device 310 further includes various electronics 112, including one or more processors 112*a* and a memory 112*b* storing program instructions that, when executed, cause the processor(s) 112*a* to perform some or all of the operations described herein.

The passive speaker 340 includes one or more transducers 314, such as one or more speaker drivers, configured to receive audio signals from the amplifier(s) 312*h* and output the received audio signals as sound. The passive speaker 340 further includes the RFID/NFC tag 346 and the passive speaker identification circuit 342 for communicating one or more characteristics of the passive speaker 340 to the playback device 310. However, unlike the above examples, in the present example the RFID/NFC tag 346 is included in the passive speaker identification circuit 342, such that the playback device 310 queries the RFID/NFC tag 346 for speaker identification data, as described in further detail below.

In order to facilitate querying the RFID/NFC tag 346, the playback device 310 further includes a reader circuit 602. The reader circuit 602 includes an NFC reader or an RFID reader, shown in FIG. 6 as RFID/NFC reader 604. If the tag 346 is an NFC tag, then the RFID/NFC reader 604 can be an NFC reader. Similarly, if the tag 346 is an RFID tag, then the RFID/NFC reader 604 can be an RFID reader.

Conventionally, RFID and NFC readers can wirelessly query and obtain data from RFID and NFC tags. As such, both the readers and the tags include, or are otherwise coupled to, one or more antennae for wireless communication. As shown in FIG. 6, the RFID/NFC reader 604 is electrically coupled to a first reader antenna 606, and the RFID/NFC tag 346 is electrically coupled to a first tag antenna 642.

However, unlike conventional reader and tag configurations, the RFID/NFC reader 604 does not directly communicate with the RFID/NFC tag 346 via the first reader antenna 606 and the first tag antenna 642. Rather, to facilitate communication between the RFID/NFC reader 604 and the RFID/NFC tag 346, the reader circuit 602 further includes a second reader antenna 608, and the passive speaker identification circuit 342 further includes a second tag antenna 644. The second reader antenna 608 electrically couples the first reader antenna 606 to the output terminal(s) 311 of the playback device 310. The second tag antenna 644 electrically couples the first tag antenna 642 to the input terminal(s) 341 of the passive speaker 340. As shown, the first reader antenna 606 and second reader antenna 608 are implemented as inductively coupled loop antennas, as are the first tag antenna 642 and the second tag antenna 644. However, different antenna configurations can be implemented in other examples. In some embodiments, one or more of the antennas 606, 608, 642, and 644 may be removed. For example, all of the antennas 606, 608, 642, and 644 may be removed and the RFID/NFC reader 604 may be coupled to the RFID/NFC tag 346 via wired connections.

In operation, the RFID/NFC reader 604 generates and outputs a query signal to the first reader antenna 606, and the first reader antenna 606 transmits the query signal to the second reader antenna 608. The query signal propagates from the second reader antenna 608, to the output terminal (s) 311 of the playback device 310, along the speaker wire 620, to the input terminal(s) 341 of the passive speaker 340, and to the second tag antenna 644. The second tag antenna 644 transmits the query signal to the first tag antenna 642, and the query signal propagates from the first tag antenna 642 to the RFID/NFC tag 346.

In response to receiving the query signal, the RFID/NFC tag 346 generates and outputs a response signal to the first tag antenna 642, and the first tag antenna 642 transmits the query signal to the second tag antenna 644. The response signal propagates from the second tag antenna 644, to the input terminal(s) 341 of the passive speaker 340, along the speaker wire 620, to the output terminal(s) 311 of the playback device 310, and to the second reader antenna 608. The second reader antenna 608 transmits the response signal to the first reader antenna 606, and the response signal propagates from the first reader antenna 606 to the RFID/NFC reader 604.

In this manner, the RFID/NFC reader 604 can communicate with the RFID/NFC tag 346 over the same speaker wire 620 that carries audio signals from the amplifier(s) **312*h* to the one or more transducers 314. Further, the RFID/NFC tag 346 may, in some embodiments, be positioned in the passive speaker 340 so as to still also be readable wirelessly from an RFID/NFC reader in another device (e.g., a smartphone). For example, the RFID/NFC tag 346 may be positioned along a surface of the passive speaker 340**.

In examples where the reader 604 is an RFID reader and the tag 346 is an RFID tag, the query signal can be an RFID query signal and the response signal can be an RFID response signal in accordance with the RFID communication protocol. In examples where the reader 604 is an NFC reader and the tag 346 is an NFC tag, the query signal can be an NFC query signal and the response signal can be an NFC response signal in accordance with the NFC communication protocol. However, the reader 604 and the tag 346 can alternatively communicate in accordance with any other radio frequency protocol now known or later developed.

In some examples, the RFID/NFC reader 604 communicates with the RFID/NFC tag 346 while the amplifier(s) **312*h* drive the passive speaker 340. For instance, the amplifier(s) 312*h* can output an audio signal via the output terminal(s) 311 of the playback device 310 at the same time the RFID/NFC reader 604 outputs the query signal via the output terminal(s) 311. As such, the audio signal and the query signal are superimposed and received concurrently by the passive speaker 340 via the input terminal(s) 341 of the passive speaker 340. Similarly, the RFID/NFC tag 346 can output the response signal via the input terminal(s) 341 of the passive speaker 340 while the amplifier(s) 312*h* output the audio signal via the output terminal(s) 311 of the playback device 310, such that the audio signal and the response signal are superimposed at the output terminal(s) 311 of the playback device 310**.

Audio components of the playback device 310 and the passive speaker 340, including the amplifier(s) **312*h* and the transducer(s) 314, can be designed to interface with signals in a frequency range that differs from the reader circuit 602 and the passive speaker identification circuit 342. For instance, the audio components are designed to output and/or receive signals in the audio frequency range, while the reader circuit 602 and the passive speaker identification circuit 342 can be designed to output and/or receive signals in the radio frequency range, such as 13.56 MHz for NFC and RFID signals. Exposing the audio components to radio frequency signals and exposing the reader circuit 602 and the passive speaker identification circuit 342 might cause undesirable and/or unpredictable consequences, such as inhibiting their operation or damaging their electrical components. For example, the load impedance seen by the amplifier(s) 312*h* would look like a short circuit at typical audio frequencies (e.g., between 20 Hz and 20 kHz) at least because of the second reader antenna 608. As such, it can be desirable to isolate the audio components from signals generated by the reader circuit 602 and the passive speaker identification circuit 342, and to likewise isolate the reader circuit 602 and the passive speaker identification circuit 342** from signals generated by the audio components.

In order to help isolate the various components from unwanted signals, the playback device 310 further includes one or more filters shown as a low-pass filter 610 and a high-pass filter 612. The low-pass filter 610 is coupled between the amplifier(s) **312*h* and the output terminal(s) 311 of the playback device 310. The low-pass filter 610 can have a transfer function that allows signals in the audio frequency range to pass through the low-pass filter 610 while attenuating signals above the audio frequency range. In this manner, the low-pass filter 610 passes audio signals output by the amplifier(s) 312*h* to the output terminal(s) 311, but the low-pass filter 610 attenuates radio frequency signals, such as the query signal output by the RFID/NFC reader 604 or the response signal received from the RFID/NFC tag 346, thereby reducing or preventing the radio frequency signals from being transmitted to the amplifier(s) 312*h***.

The high-pass filter 612 of the playback device 310 is coupled between the RFID/NFC reader 604 and the output terminal(s) 311 of the playback device 310. The high-pass filter 612 can have a transfer function that allows signals above the audio frequency range, such as radio frequency signals, to pass through the high-pass filter 612 while attenuating lower frequency signals, such as those in the audio frequency range or below the radio frequency range. In this manner, the high-pass filter 612 passes radio frequency signals, such as the query signal output by the RFID/NFC reader 604 or the response signal received from the RFID/NFC tag 346, between the RFID/NFC reader 604 and the output terminal(s) 311, but the high-pass filter 612 attenuates audio signals output by the amplifier(s) **312*h*, thereby reducing or preventing the audio signals from being transmitted to the RFID/NFC reader 604**.

Similarly, the passive speaker 340 includes a low-pass filter 646 and a high-pass filter 648 to help isolate its various components from unwanted signals. As shown, the low-pass filter 646 is coupled between the transducer(s) 314 and the input terminal(s) 341 of the passive speaker 340. The low-pass filter 646 can have a transfer function that allows signals in the audio frequency range to pass through the low-pass filter 646 while attenuating signals above the audio frequency range. In this manner, the low-pass filter 646 passes audio signals received at the input terminal(s) 341 to the transducer(s) 314, but the low-pass filter 646 attenuates radio frequency signals, such as the query signal received from the RFID/NFC reader 604 or the response signal output by the RFID/NFC tag 346, thereby reducing or preventing the radio frequency signals from being transmitted to the transducer(s) 314.

The high-pass filter 648 of the passive speaker 340 is coupled between the RFID/NFC tag 346 and the input terminal(s) 341 of the passive speaker 340. The high-pass filter 648 can have a transfer function that allows signals above the audio frequency range, such as radio frequency signals, to pass through the high-pass filter 648 while attenuating lower frequency signals, such as those in the audio frequency range or below the radio frequency range. In this manner, the high-pass filter 648 passes radio frequency signals, such as the query signal received from the RFID/NFC reader 604 or the response signal output by the RFID/NFC tag 346, between the RFID/NFC tag 346 and the input terminal(s) 341, but the high-pass filter 648 attenuates audio signals received at the input terminal(s) 341, thereby reducing or preventing the audio signals from being transmitted to the RFID/NFC tag 346 and preventing inappropriate impedances from being presented to the amplifier(s) 312(*h*).

It should be appreciated that components separate and apart from filters may be employed to provide isolation between components. In some embodiments, one or more of the filters 610, 612, 646, and 648 may be replaced with a switching circuit comprising one or more switches. For example, the high-pass filter 612 may be replaced with such a switching circuit that selectively couples the second reader antenna 608 to the one or more output terminals 311. In this example, the switch may be controlled so as to be open when the amplifier(s) 312*h* are not providing an amplified output signal (e.g., the amplifier(s) 312(*h*) are powered down, in a high-impedance state, etc.) and otherwise left closed such that the RFID/NFC reader 604 can communicate with the RFID/NFC tag 346. The switch may be controlled by any of a variety of components including, for example, a processor (not shown) within the playback device 310 and/or the RFID/NFC reader 604.

It should be appreciated that the switching circuits described above may be employed for additional purposes separate and apart from providing isolation between components. In some embodiments, the playback device 310 may have a plurality of output terminals 311 that are organized into a plurality of output terminals sets (e.g., pairs) that each couple (e.g., via speaker wire) to a single passive speaker 340 from a plurality of passive speakers 340. For example, the playback device 310 may comprise two sets of output terminals (e.g., for playback of stereo sound comprising a left channel and a right channel) including a first set that couples to a first passive speaker (e.g., a passive speaker to playback the left channel) and a second set that couples to a second passive speaker (e.g., a passive speaker to playback the right channel). In these embodiments, a switching circuit may be disposed between the second reader antenna 608 and the plurality of output terminals 311 (e.g., the switching circuit may replace high-pass filter 648 or be used in conjunction with high-pass filter 649). The switching circuit may selectively couple the second reader antenna 608 to any one of the sets of output terminals. For example, the switching circuit may have any combination of the following states: (1) a first state that couples the second reader antenna 608 to a first set of output terminals configured to couple to a first passive speaker (e.g., a passive speaker for playback of the left channel of audio) such that the playback device 310 may uniquely identify the first passive speaker; (2) a second state that couples the second reader antenna 608 to the second set of output terminals configured to couple to a second passive speaker (e.g., a passive speaker for playback of the right channel of audio) such that the playback device 310 may uniquely identify the second passive speaker; and (3) a third state where the second reader antenna 608 is disconnected from both the first and second sets of output terminals. Thus, the switching circuit may be employed to enable a single RFID/NFC reader 604 in the playback device 310 to communicate with a plurality of RFID/NFC tags 346 distributed between a respective plurality of passive speakers 340.

In at least some of the above described embodiments, the query signal provided by the playback device 310 (e.g., via the RFID/NFC reader 604) performs both the functions of: (1) providing energy to the RFID/NFC tag 346 to generate a response; and (2) triggering the RFID/NFC tag 346 to transmit a response via the speaker wire 620. In some embodiments, the RFID/NFC tag 346 may harvest energy from a source separate and apart from the query signal (e.g., the query signal may only perform the second triggering function and not be used to provide energy to power the RFID/NFC tag 346). For example, the passive speaker 340 may comprise one or more energy harvesters that harvest energy from the environment surrounding the passive speaker 340. Examples of such energy harvesters include acoustic energy harvesters that harvest energy from the acoustic waves generated by the transducer(s) 314 during audio playback and solar panels that obtain energy from light. In this example, the energy from the energy harvesters may be employed to power one or more components that generate the response to the query signal (e.g., the RFID/NFC tag 346). Additionally (or alternatively), in some embodiments, the passive speaker 340 may provide a response to the playback device 310 via a channel that is separate from the speaker wire 620. For example, the RFID/NFC reader 604 may be replaced with a signal generator that generates a signal that mimics the query signal output by the RFID/NFC reader 604 (e.g., a 13.56 MHz signal). In turn, the RFID/NFC tag 346 may harvest energy from the query signal and use the signal as a trigger to send a response to the playback device 310 via a separate channel (e.g., a wireless communication link such as a BLUETOOTH LOW ENERGY (BLE) link, a BLUETOOTH CLASSIC link, or other such wireless communication link). In this example, the circuitry required to send the response from via the separate channel may also be powered by the energy harvested from the query signal and/or obtained from another source (e.g., an acoustic energy harvester, solar panel, etc.). Still yet further, in some embodiments, the passive speaker 340 may not use the RFID/NFC tag 346 to generate the response to the query signal. For example, the RFID/NFC tag, upon receipt of the query signal, may trigger one or more other components to respond to the playback device 310 (e.g., trigger the passive speaker to transmit a response via impedance modulation as described above with respect to at least FIGS. 3B, 3C, and 3D).

Figure 7:
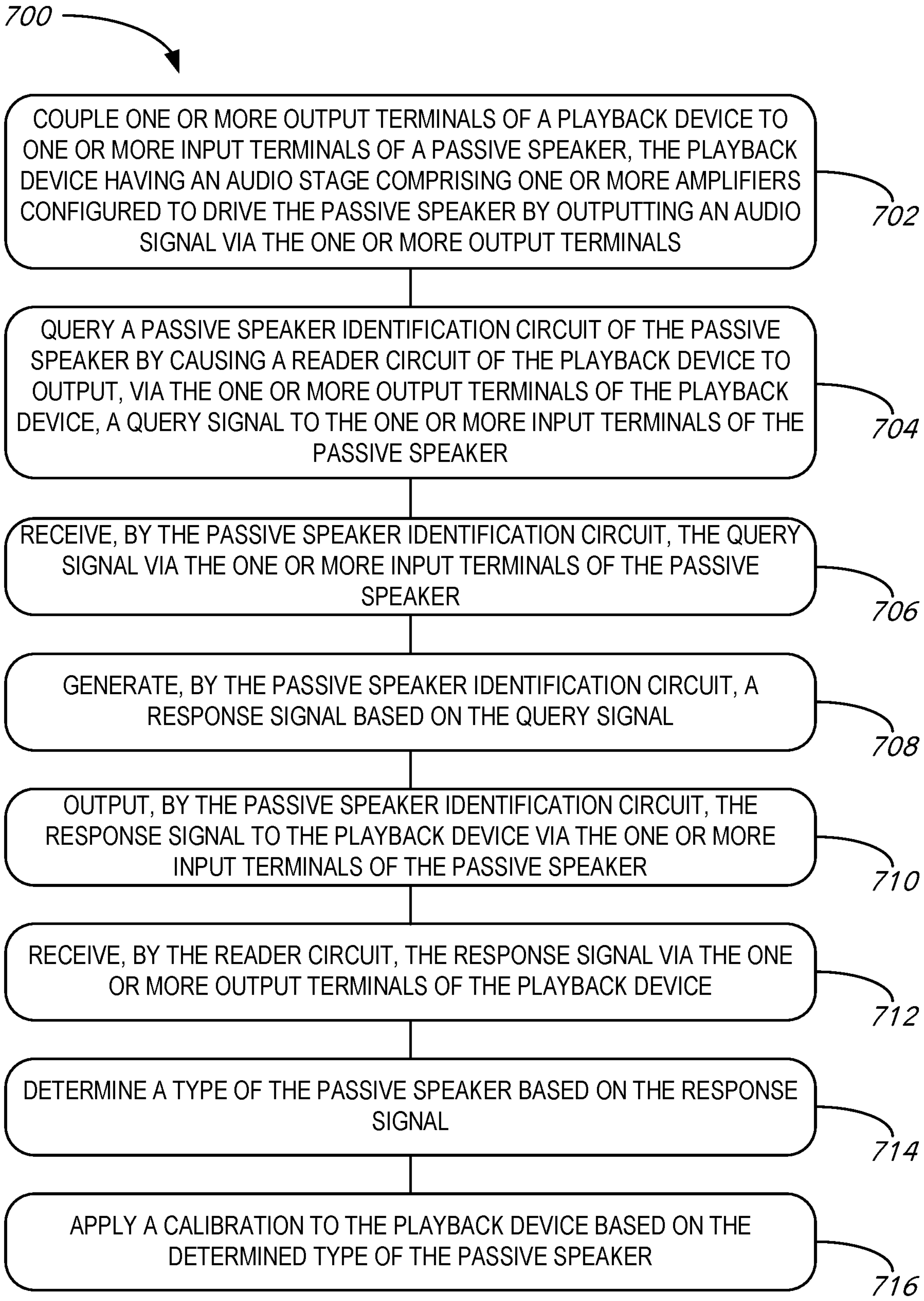
FIG. 7 is a flowchart of a method for authenticating a passive speaker to enable calibration of a playback device.

FIG. 7 shows an example method 700 for authenticating a passive speaker to enable calibration of a playback device. Method 700 can be implemented by any of the playback devices and passive speakers disclosed and/or described herein, or any other playback device or passive speaker now known or later developed.

Various embodiments of method 700 include one or more operations, functions, and actions illustrated by blocks 702 through 716. Although the blocks are illustrated in sequential order, when possible, these blocks may also be performed in parallel, and/or in a different order than the order disclosed and described herein. Also, the various blocks may be combined into fewer blocks, divided into additional blocks, and/or removed based upon a desired implementation.

In addition, for the method 700 and for other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and for other processes and methods disclosed herein, each block in FIG. 7 may represent circuitry that is wired to perform the specific logical functions in the process.

Method 700 begins at block 702, which involves coupling one or more output terminals of the playback device to one or more input terminals of the passive speaker. In line with the discussion above, the playback device includes an audio stage having one or more audio amplifiers configured to drive the passive speaker by outputting an audio signal via the one or more output terminals of the playback device.

At block 704, method 700 involves querying a passive speaker identification circuit of the passive speaker by causing a reader circuit of the playback device to output, via the one or more output terminals of the playback device, a query signal to the one or more input terminals of the passive speaker. In line with the discussion above, the reader circuit can include an NFC reader or an RFID reader, and the query signal can be an NFC query signal or an RFID query signal. In some examples, the playback device queries the passive speaker identification circuit while the one or more audio amplifiers of the playback device drive the passive speaker via the one or more output terminals of the playback device and the one or more input terminals of the passive speaker.

At block 706, method 700 involves receiving, by the passive speaker identification circuit, the query signal via the one or more input terminals of the passive speaker. In some examples, the passive speaker identification circuit receives the query signal via the one or more output terminals of the playback device and the one or more input terminals of the passive speaker while the playback device drives the passive speaker via those same terminals.

At block 708, method 700 involves generating, by the passive speaker identification circuit, a response signal based on the query signal. In line with the discussion above, the passive speaker identification circuit can include an NFC tag or an RFID tag, and generating the response signal can involve the NFC tag generating an NFC response signal or the RFID tag generating an RFID response signal.

At block 710, method 700 involves outputting, by the passive speaker identification circuit, the response signal to the playback device via the one or more input terminals of the passive speaker.

At block 712, method 700 involves receiving, by the reader circuit, the response signal via the one or more output terminals of the playback device.

At block 714, method 700 involves the playback device determining a type of the passive speaker based on the response signal.

At block 716, method 700 involves applying a calibration to the playback device based on the determined type of the passive speaker. In line with the discussion above, applying the calibration to the playback device can involve adjusting a calibration process based on the determined type of the passive speaker. Additionally or alternatively, applying the calibration to the playback device can involve performing the calibration process to identify an audio processing algorithm that, when applied to the playback device, results in audio content output by the passive speaker having a target audio characteristic, such as a target frequency response, at one or more locations in an environment of the passive speaker.

In some examples, the playback device further includes a first filter electrically coupled between the one or more audio amplifiers and the one or more output terminals, and a second filter electrically coupled between the reader circuit and the one or more output terminals. In such examples, method 700 further involves the first filter attenuating at least some frequencies above a threshold frequency, and the second filter attenuating at least some frequencies below the threshold frequency. The threshold frequency can be a lower frequency than the frequencies of the query signal and response signal, and can be a higher frequency than audio signals output by the one or more amplifiers of the playback device. As such, method 700 can further involve the first filter attenuating transmission of the query signal and the response signal to the one or more audio amplifiers, and the second filter attenuating transmission of audio signals to the reader circuit.

Similarly, in some examples, the passive speaker further includes a first filter electrically coupled between the one or more input terminals and the at least one transducer, and a second filter electrically coupled between the one or more input terminals and the passive speaker identification circuit. In such examples, method 700 further involves the first filter attenuating transmission of the query signal and the response signal to the at least one transducer, and the second filter attenuating transmission of audio signals to the passive speaker identification circuit.

In some examples, the passive speaker identification circuit further includes data storage, which can be implemented as part of the NFC tag or RFID tag. The data storage stores speaker identification data including at least one of: (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing an impedance of the passive speaker at one or more frequencies, (vii) data representing a thermal response of the passive speaker (viii) factory measurement/calibration data specific to that individual speaker, or (iv) data corresponding to functional capabilities of the speaker. In such examples, generating the response signal involves encoding the speaker identification data into the response signal. And determining the type of the passive speaker based on the response signal involves decoding the speaker identification data from the response signal and determining the type of the passive speaker based on the decoded speaker identification data.

In some embodiments, the playback device may be coupled to a plurality of passive speakers. For example, the playback device may be coupled to a first passive speaker for playback of the left channel of stereo audio content and a second passive speaker for playback of the right channel of stereo audio content. In these examples, the playback device may repeat all (or any portion) of processes 500 and/or 700 for each passive speaker connected to the playback device. For example, the playback device may repeat the entire process 500 for each passive speaker connected to the playback device. In another example, the playback device may repeat one or more of blocks 704, 712, 714, and/or 716 in process 700 for each passive speaker connected to the playback device.

Further, in some embodiments, one or more additional blocks may be incorporated into process 700 to limit communication to a subset of passive speakers connected to the playback in implementations where multiple passive speakers are simultaneously coupled to the playback device. In these embodiments, the one or more additional blocks may be incorporated before, for example, block 704. In some implementations, the additional blocks may comprise the playback device controlling the state of a switching circuit to selectively couple one or more components of a reader circuit (e.g., reader circuit 602) to particular sets of output terminals of the playback device (e.g., each of the sets being connected to a respective passive speaker). In other implementations, the additional blocks may comprise the playback device (e.g., via one or more components of a reader circuit such as reader circuit 602) disabling one or more data tags in the passive speakers so as to communicate with a limited portion of the data tags in the passive speakers at a time (e.g., one data tag in one passive speaker at a time). For example, the playback device may disable all data tags in the passive speakers with a particular set of characteristics (e.g., the passive speaker has already been uniquely identified, the data tag has an address that falls within a specified range, etc.).

It should be appreciated that the speaker identification techniques described herein may be readily employed for purposes separate and apart from speaker calibration. In some embodiments, the speaker identification techniques described herein may be employed for product registration purposes. For example, the playback device may identify that a new speaker was connected to the playback device and register the new speaker to the same customer account that the playback device is registered to (e.g., via communicating with one or more cloud server associated with product registration).

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

(Feature 1) A method to be performed by a playback device comprising: one or more output terminals couplable to an input terminal of a passive speaker of a particular type, the particular type of passive speaker having particular acoustic characteristics; an audio stage comprising one or more audio amplifiers configured to drive passive speakers connected to the one or more output terminals, the one or more audio amplifiers comprising a current sensor; one or more processors; and a housing carrying the one or more output terminals, the audio stage, the one or more processors, and data storage, the data storage having stored thereon instructions executable by the one or more processors to cause the playback device to perform the method. The method comprising: activating a passive speaker identification circuit of the passive speaker by outputting, via the one or more audio amplifiers and the one or more output terminals, an identification signal to the input terminal of the passive speaker; while the passive speaker identification circuit is active, measuring, via the current sensor, an electrical current of the identification signal; determining, based on the measured electrical current, an impedance modulation of the passive speaker; determining the particular type of the passive speaker based on the determined impedance modulation of the passive speaker; and applying a calibration to the playback device based on the determined particular type of the passive speaker.

(Feature 2) The method of feature 1, further comprising: performing an acoustic calibration of the playback device and the passive speaker; and offsetting the particular acoustic characteristics of the passive speaker during the acoustic calibration of the playback device and the passive speaker.

(Feature 3) The method of feature 1, wherein: the passive speaker identification circuit comprises a serial LCR circuit in parallel to one or more speaker drivers of the passive speaker; outputting the identification signal to the input terminal of the passive speaker comprises outputting a series of identification tones at respective frequencies; measuring the electrical current of the identification signal comprises measuring electrical currents corresponding to each identification tone; determining the impedance modulation of the passive speaker comprises determining that a particular identification tone caused a particular change in the measured electrical current; and determining the particular type of the passive speaker based on the determined impedance modulation of the passive speaker comprises determining a particular type of the passive speaker that corresponds to the particular identification tone.

(Feature 4) The method of feature 1, wherein the passive speaker identification circuit comprises a controller; outputting the identification signal to the input terminal of the passive speaker comprises outputting the identification signal to power the controller, wherein the controller, when powered, modulates the impedance of the passive speaker in a particular pattern corresponding to the particular type of the passive speaker; measuring the electrical current of the identification signal comprises measuring the electrical current of the identification signal while the controller modulates the impedance of the passive speaker in the particular pattern corresponding to the particular type of the passive speaker; determining the impedance modulation of the passive speaker comprises determining, based on the measured electrical current of the identification signal, the particular pattern; and determining the particular type of the passive speaker based on the determined impedance modulation of the passive speaker comprises determining a particular type of the passive speaker that corresponds to the particular pattern.

(Feature 5) The method of feature 4, wherein the passive speaker identification circuit comprises a parallel impedance in parallel with one or more speaker drivers of the passive speaker, and wherein modulating the impedance of the passive speaker in the particular pattern corresponding to the particular type of the passive speaker comprises switching the parallel impedance in parallel with the one or more speaker drivers according to the particular pattern.

(Feature 6) The method of feature 4, wherein the passive speaker identification circuit comprises a switch in series with one or more speaker drivers of the passive speaker, and wherein modulating the impedance of the passive speaker in the particular pattern corresponding to the particular type of the passive speaker comprises switching the switch in series with the one or more speaker drivers according to the particular pattern.

(Feature 7) The method of feature 4, wherein the passive speaker identification circuit comprises a series impedance in series with one or more speaker drivers of the passive speaker, and wherein modulating the impedance of the passive speaker in the particular pattern corresponding to the particular type of the passive speaker comprises switching the series impedance in series with the one or more speaker drivers according to the particular pattern.

(Feature 8) The method of feature 4, wherein the passive speaker identification circuit further comprises data storage having stored thereon speaker identification data comprising at least one of (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing the impedance of the passive speaker at one or more frequencies, or (vii) data representing a thermal response of the passive speaker; modulating the impedance of the passive speaker in the particular pattern corresponding to the particular type of the passive speaker comprises modulating the impedance of the passive speaker in a particular pattern corresponding to the speaker identification data; and determining the particular type of the passive speaker based on the determined impedance modulation of the passive speaker comprises determining the speaker identification data based on the impedance of the passive speaker being modulated in the particular pattern corresponding to the speaker identification data.

(Feature 9) The method of feature 1, wherein the passive speaker comprises: one or more speaker drivers coupled to the input terminal of the passive speaker; and a housing carrying the input terminal, the one or more speaker drivers coupled to the input terminal, and the passive speaker identification circuit.

(Feature 10) A playback device configured to perform the method of any of features 1-9.

(Feature 11) A tangible, non-transitory computer-readable medium having stored therein instructions executable by one or more processors to cause a device to perform the method of any of features 1-9.

(Feature 12) A system configured to perform the method of any of features 1-9.

(Feature 13) A method to be performed by a playback device, the method comprising: (i) querying, by a playback device, a passive speaker identification circuit of a passive speaker, wherein the passive speaker is a particular type of passive speaker having particular acoustic characteristics, wherein the playback device includes one or more output terminals coupled to one or more input terminals of the passive speaker, wherein the playback device includes an audio stage comprising one or more audio amplifiers configured to drive passive speakers connected to the one or more output terminals, and wherein querying the passive speaker identification circuit comprises causing a reader circuit of the playback device to output, via the one or more output terminals, a query signal to the one or more input terminals of the passive speaker; (ii) receiving, by the reader circuit via the one or more output terminals, a response signal in response to the query signal; (iii) determining, by the playback device, the particular type of the passive speaker based on the response signal; and (iv) applying, by the playback device, a calibration to the playback device based on the determined particular type of the passive speaker.

(Feature 14) The method of feature 13, further comprising: performing, by the playback device, an acoustic calibration of the playback device and the passive speaker; and offsetting, by the playback device, the particular acoustic characteristics of the passive speaker during the acoustic calibration of the playback device and the passive speaker.

(Feature 15) The method of feature 13, wherein: the reader circuit comprises an NFC reader or an RFID reader; the passive speaker identification circuit comprises an NFC tag or an RFID tag; the query signal comprises a first NFC signal or a first RFID signal; and the response signal comprises a second NFC signal or a second RFID signal.

(Feature 16) The method of feature 13, further comprising: causing the one or more audio amplifiers to drive the passive speaker via the one or more output terminals, wherein querying the passive speaker identification circuit comprises causing the reader circuit to output, via the one or more output terminals, the query signal while the one or more audio amplifiers drive the passive speaker via the one or more output terminals.

(Feature 17) The method of feature 16, wherein the reader circuit receives the response signal via the one or more output terminals while the one or more audio amplifiers drive the passive speaker via the one or more output terminals.

(Feature 18) The method of feature 13, wherein: the passive speaker identification circuit further comprises data storage having stored thereon speaker identification data comprising at least one of: (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing an impedance of the passive speaker at one or more frequencies, or (vii) data representing a thermal response of the passive speaker; the response signal is encoded with the speaker identification data; and determining the particular type of the passive speaker based on the response signal comprises decoding the speaker identification data from the response signal and determining the particular type of the passive speaker based on the decoded speaker identification data.

(Feature 19) The method of feature 13, wherein the playback device further comprises: a first filter electrically coupled between the one or more audio amplifiers and the one or more output terminals; and a second filter electrically coupled between the reader circuit and the one or more output terminals.

(Feature 20) The method of feature 19, wherein: the first filter is configured to attenuate transmission of the query signal and the response signal to the one or more audio amplifiers; and the second filter is configured to attenuate transmission of audio signals to the reader circuit.

(Feature 21) The method of feature 13, wherein the passive speaker further comprises: a first filter electrically coupled between the one or more input terminals and at least one transducer of the passive speaker; and a second filter electrically coupled between the one or more input terminals and the passive speaker identification circuit.

(Feature 22) The method of feature 21, wherein: the first filter is configured to attenuate at least some frequencies above a threshold frequency; and the second filter is configured to attenuate at least some frequencies below the threshold frequency.

(Feature 23) The method of feature 13, further comprising determining whether a single passive speaker or a plurality of passive speakers are connected to the one or more output terminals at least in part by: measuring an effective load impedance at the one or more output terminals (e.g., via the integrated voltage and current sensing), and comparing the measurement to a reference load impedance (e.g., for the identified model of passive speaker).

(Feature 24) The method of feature 23, further comprising: responsive to determining that the plurality of passive speakers are connected to the one or more output terminals, identifying the particular type of each of the plurality of passive speakers.

(Feature 25) The method of feature 13, further comprising identifying a reference load impedance of the passive speaker based on the response signal.

(Feature 26) The method of feature 25, wherein identifying the reference load impedance comprises: using an identifying code (e.g., passive speaker's model number, serial number, etc.) in the response to lookup the reference load impedance of the passive speaker in a database.

(Feature 27) A tangible, non-transitory computer-readable medium having stored therein instructions executable by one or more processors to cause a device to perform the method of any of features 13-26.

(Feature 28) A system configured to perform the method of any of features 13-26.

(Feature 29) A passive speaker comprising: (i) one or more input terminals couplable to one or more output terminals of a playback device; (ii) at least one transducer electrically coupled to the one or more input terminals, wherein the at least one transducer is configured to generate sound based on an audio drive signal received via the one or more input terminals; and (iii) a passive speaker identification circuit electrically coupled between the one or more input terminals and the at least one transducer, wherein the passive speaker identification circuit is configured to receive a query signal from the playback device via the one or more input terminals, generate a response signal based on the query signal, and output the response signal to the playback device via the one or more input terminals.

(Feature 30) The passive speaker of feature 29, wherein: the passive speaker identification circuit comprises an NFC tag or an RFID tag; the query signal comprises a first NFC signal or a first RFID signal; and the response signal comprises a second NFC signal or a second RFID signal.

(Feature 31) The passive speaker of feature 29, wherein the passive speaker identification circuit is configured to receive the query signal, generate the response signal, and output the response signal while the at least one transducer generates sound based on the audio drive signal received via the one or more input terminals.

(Feature 32) The passive speaker of feature 29, wherein: the passive speaker identification circuit further comprises data storage having stored thereon speaker identification data comprising at least one of: (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing an impedance of the passive speaker at one or more frequencies, or (vii) data representing a thermal response of the passive speaker; and generating the response signal comprises encoding the response signal with the speaker identification data.

(Feature 33) The passive speaker of feature 29, further comprising: a first filter electrically coupled between the one or more input terminals and the at least one transducer; and a second filter electrically coupled between the one or more input terminals and the passive speaker identification circuit.

(Feature 34) The passive speaker of feature 33, wherein: the first filter is configured to attenuate transmission of the query signal and the response signal to the at least one transducer; and the second filter is configured to attenuate transmission of the audio drive signal to the passive speaker identification circuit.

(Feature 35) A system comprising: a playback device; and a passive speaker of a particular type, the particular type of passive speaker having particular acoustic characteristics; wherein the playback device comprises: (i) one or more output terminals couplable to one or more input terminals of the passive speaker, (ii) an audio stage comprising one or more audio amplifiers configured to drive the passive speaker when connected to the one or more output terminals, (iii) a reader circuit, (iv) one or more processors, (v) data storage having stored thereon instructions executable by the one or more processors to cause the playback device to perform operations, and (vi) a first housing carrying the one or more output terminals, the audio stage, the reader circuit, the one or more processors, and the data storage; wherein the passive speaker comprises: (i) at least one transducer electrically coupled to the one or more input terminals, wherein the at least one transducer is configured to generate sound based on an audio drive signal received from the playback device via the one or more input terminals, (ii) a passive speaker identification circuit electrically coupled between the one or more input terminals and the at least one transducer, and (iii) a second housing carrying the one or more input terminals, the at least one transducer, and the passive speaker identification circuit; and wherein the operations comprise: (i) querying the passive speaker identification circuit of the passive speaker by causing the reader circuit to output, via the one or more output terminals, a query signal to the one or more input terminals of the passive speaker, wherein the passive speaker identification circuit receives the query signal from the playback device via the one or more input terminals, generates a response signal based on the query signal, and outputs the response signal to the playback device via the one or more input terminals, and wherein the reader circuit receives, via the one or more output terminals, the response signal, (ii) determining the particular type of the passive speaker based on the response signal, and (iii) applying a calibration to the playback device based on the determined particular type of the passive speaker.

(Feature 36) The system of feature 35, wherein the operations further comprise: performing an acoustic calibration of the playback device and the passive speaker; and offsetting the particular acoustic characteristics of the passive speaker during the acoustic calibration of the playback device and the passive speaker.

(Feature 37) The system of feature 35, wherein: the reader circuit comprises an NFC reader or an RFID reader; the passive speaker identification circuit comprises an NFC tag or an RFID tag; the query signal comprises a first NFC signal or a first RFID signal; and the response signal comprises a second NFC signal or a second RFID signal.

(Feature 38) The system of feature 35, wherein the operations further comprise causing the one or more audio amplifiers to drive the passive speaker with the audio drive signal via the one or more output terminals, and wherein querying the passive speaker identification circuit comprises causing the reader circuit to output, via the one or more output terminals, the query signal while the one or more audio amplifiers drive the passive speaker via the one or more output terminals.

(Feature 39) The system of feature 38, wherein the passive speaker identification circuit receives the query signal via the one or more input terminals, generates the response signal, and output the response signal via the one or more input terminals while the at least one transducer generates sound based on the audio drive signal received via the one or more input terminals.

(Feature 40) The system of feature 39, wherein the reader circuit receives the response signal via the one or more output terminals while the one or more audio amplifiers drive the passive speaker with the audio drive signal via the one or more output terminals.

(Feature 41) The system of feature 35, wherein: the passive speaker identification circuit further comprises data storage having stored thereon speaker identification data comprising at least one of: (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing an impedance of the passive speaker at one or more frequencies, or (vii) data representing a thermal response of the passive speaker; the response signal is encoded with the speaker identification data; and determining the particular type of the passive speaker based on the response signal comprises decoding the speaker identification data from the response signal and determining the particular type of the passive speaker based on the decoded speaker identification data.

(Feature 42) The system of feature 35, wherein the playback device further comprises: a first filter electrically coupled between the one or more audio amplifiers and the one or more output terminals; and a second filter electrically coupled between the reader circuit and the one or more output terminals.

(Feature 43) The system of feature 42, wherein: the first filter is configured to attenuate at least some frequencies above a threshold frequency; and the second filter is configured to attenuate at least some frequencies below the threshold frequency.

(Feature 44) The system of feature 35, wherein the passive speaker further comprises: a first filter electrically coupled between the one or more input terminals and the at least one transducer; and a second filter electrically coupled between the one or more input terminals and the passive speaker identification circuit.

(Feature 45) The system of feature 44, wherein: the first filter is configured to attenuate at least some frequencies above a threshold frequency; and the second filter is configured to attenuate at least some frequencies below the threshold frequency.

(Feature 46) A passive speaker identification circuit for a passive speaker, the passive speaker identification circuit comprising: one or more terminals configured to couple to one or more input terminals of the passive speaker that are configured to couple to a playback device; and one or more components coupled to the one or more terminals and configured to: (i) receive a query signal from the playback device via the one or more input terminals of the passive speaker, (ii) generate a response signal based on the query signal, and (iii) output the response signal to the playback device via the one or more input terminals.

(Feature 47) The passive speaker identification circuit of feature 46, wherein the one or more components comprise at least one of: an NFC tag, an RFID tag, an LRC circuit, an antenna, a filter, and a switch.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A playback device comprising:

one or more output terminals couplable to one or more input terminals of a passive speaker of a particular type, the particular type of passive speaker having particular acoustic characteristics;

an audio stage comprising one or more audio amplifiers configured to drive passive speakers connected to the one or more output terminals;

a reader circuit;

one or more processors;

at least one non-transitory computer-readable medium; and a housing carrying the one or more output terminals, the audio stage, the reader circuit, the one or more processors, and the at least one non-transitory computer-readable medium, the at least one non-transitory computer-readable medium comprising program instructions that are executable by the one or more processors such that the playback device is configured to:

query a passive speaker identification circuit of the passive speaker by causing the reader circuit to output, via the one or more output terminals, a query signal to the one or more input terminals of the passive speaker, wherein the reader circuit receives, via the one or more output terminals, a response signal in response to the query signal;

determine the particular type of the passive speaker based on the response signal;

apply a speaker calibration to the playback device that at least partially offsets acoustic characteristics of passive speakers that are of the determined particular type;

adjust settings of an acoustic calibration from a first configuration to a second configuration that corresponds to the determined particular type of the passive speaker, wherein the second configuration reduces current delivered to the passive speaker when outputting calibration audio signals output during an acoustic calibration;

while the speaker calibration is applied to the playback device, perform the acoustic calibration of the passive speaker in a particular environment, wherein the program instructions that are executable by the one or more processors such that the playback device is configured to perform the acoustic calibration of the passive speaker in the particular environment comprise program instructions that are executable by the one or more processors such that the playback device is configured to:

output calibration audio according to the second configuration of the acoustic calibration; and apply calibration settings from the acoustic calibration that at least partially offset acoustic characteristics of the particular environment.

2. The playback device of claim 1, wherein:

the reader circuit comprises a near-field communication (NFC) reader or a radio-frequency identification (RFID) reader;

the passive speaker identification circuit comprises an NFC tag or an RFID tag;

the query signal comprises a first NFC signal or a first RFID signal; and the response signal comprises a second NFC signal or a second RFID signal.

3. The playback device of claim 1, wherein the at least one non-transitory computer-readable medium further comprises program instructions that are executable by the one or more processors such that the playback device is configured to cause the one or more audio amplifiers to drive the passive speaker via the one or more output terminals, and wherein the program instructions that are executable by the one or more processors such that the playback device is configured to query the passive speaker identification circuit comprises program instructions that are executable by the one or more processors such that the playback device is configured to cause the reader circuit to output, via the one or more output terminals, the query signal while the one or more audio amplifiers drive the passive speaker via the one or more output terminals.

4. The playback device of claim 3, wherein the reader circuit receives the response signal via the one or more output terminals while the one or more audio amplifiers drive the passive speaker via the one or more output terminals.

5. The playback device of claim 1, wherein:

the passive speaker identification circuit further comprises data storage having stored thereon speaker identification data comprising at least one of: (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing an impedance of the passive speaker at one or more frequencies, or (vii) data representing a thermal response of the passive speaker; and the response signal is encoded with the speaker identification data.

6. The playback device of claim 5, wherein the program instructions that are executable by the one or more processors such that the playback device is configured to determine the particular type of the passive speaker based on the response signal comprises program instructions that are executable by the one or more processors such that the playback device is configured to:

decode the speaker identification data from the response signal; and determine the particular type of the passive speaker based on the decoded speaker identification data.

7. The playback device of claim 1, further comprising:

a first filter electrically coupled between the one or more audio amplifiers and the one or more output terminals; and a second filter electrically coupled between the reader circuit and the one or more output terminals.

8. The playback device of claim 7, wherein:

the first filter is configured to attenuate at least some frequencies above a threshold; and the second filter is configured to attenuate at least some frequencies below the threshold.

9. The playback device of claim 7, wherein the first filter is configured to attenuate transmission of the query signal and the response signal to the one or more audio amplifiers; and the second filter is configured to attenuate transmission of audio signals to the reader circuit.

10. At least one non-transitory computer-readable medium comprising program instructions that are executable by one or more processors such that a playback device is configured to:

query a passive speaker identification circuit of a passive speaker by causing a reader circuit of the playback device to output, via one or more output terminals of the playback device, a query signal to one or more input terminals of the passive speaker, wherein the reader circuit receives, via the one or more output terminals, a response signal in response to the query signal;

determine a particular type of the passive speaker based on the response signal; and apply a speaker calibration to the playback device that at least partially offsets acoustic characteristics of passive speakers that are of the determined particular type;

adjust settings of an acoustic calibration from a first configuration to a second configuration that corresponds to the determined particular type of the passive speaker, wherein the second configuration reduces current delivered to the passive speaker when outputting calibration audio signals output during an acoustic calibration;

while the speaker calibration is applied to the playback device, perform the acoustic calibration of the passive speaker in a particular environment, wherein the program instructions that are executable by one or more processors such that the playback device is configured to perform the acoustic calibration of the passive speaker in the particular environment comprise program instructions that are executable by one or more processors such that the playback device is configured to:

output calibration audio according to the second configuration of the acoustic calibration; and apply calibration settings from the acoustic calibration that at least partially offset acoustic characteristics of the particular environment.

11. The at least one non-transitory computer-readable medium of claim 10, wherein:

the reader circuit comprises a near-field communication (NFC) reader or a radio-frequency identification (RFID) reader;

the passive speaker identification circuit comprises an NFC tag or an RFID tag;

the query signal comprises a first NFC signal or a first RFID signal; and the response signal comprises a second NFC signal or a second RFID signal.

12. The at least one non-transitory computer-readable medium of claim 10, further comprising program instructions that are executable by the one or more processors such that the playback device is configured to cause one or more audio amplifiers of the playback device to drive the passive speaker via the one or more output terminals, and wherein the program instructions that are executable by the one or more processors such that the playback device is configured to query the passive speaker identification circuit comprises program instructions that are executable by the one or more processors such that the playback device is configured to cause the reader circuit to output, via the one or more output terminals, the query signal while the one or more audio amplifiers drive the passive speaker via the one or more output terminals.

13. The at least one non-transitory computer-readable medium of claim 12, wherein the reader circuit receives the response signal via the one or more output terminals while the one or more audio amplifiers drive the passive speaker via the one or more output terminals.

14. The at least one non-transitory computer-readable medium of claim 10, wherein:

the passive speaker identification circuit further comprises data storage having stored thereon speaker identification data comprising at least one of: (i) data representing a manufacturer of the passive speaker, (ii) data representing a model number of the passive speaker, (iii) data representing a serial number of the passive speaker, (iv) data representing a physical appearance of the passive speaker, (v) data representing peak voltage or current limits of the passive speaker, (vi) data representing an impedance of the passive speaker at one or more frequencies, or (vii) data representing a thermal response of the passive speaker; and the response signal is encoded with the speaker identification data.

15. The at least one non-transitory computer-readable medium of claim 14, wherein the program instructions that are executable by the one or more processors such that the playback device is configured to determine the particular type of the passive speaker based on the response signal comprises program instructions that are executable by the one or more processors such that the playback device is configured to:

decode the speaker identification data from the response signal; and determine the particular type of the passive speaker based on the decoded speaker identification data.

16. The at least one non-transitory computer-readable medium of claim 10, wherein the playback device further comprises:

a first filter electrically coupled between one or more audio amplifiers of the playback device and the one or more output terminals, wherein the first filter is configured to attenuate at least some frequencies above a threshold; and a second filter electrically coupled between the reader circuit and the one or more output terminals, wherein the second filter is configured to attenuate at least some frequencies above the threshold.

17. A method comprising:

querying, by a playback device, a passive speaker identification circuit of a passive speaker, wherein the passive speaker is a particular type of passive speaker having particular acoustic characteristics, wherein the playback device includes one or more output terminals coupled to one or more input terminals of the passive speaker, wherein the playback device includes an audio stage comprising one or more audio amplifiers configured to drive passive speakers connected to the one or more output terminals, and wherein querying the passive speaker identification circuit comprises causing a reader circuit of the playback device to output, via the one or more output terminals, a query signal to the one or more input terminals of the passive speaker;

receiving, by the reader circuit via the one or more output terminals, a response signal in response to the query signal;

determining, by the playback device, the particular type of the passive speaker based on the response signal; and applying, by the playback device, a speaker calibration to the playback device that at least partially offsets acoustic characteristics of passive speakers that are of the determined particular type;

adjusting settings of an acoustic calibration from a first configuration to a second configuration that corresponds to the determined particular type of the passive speaker, wherein the second configuration reduces current delivered to the passive speaker when outputting calibration audio signals output during an acoustic calibration;

while the speaker calibration is applied to the playback device, perform the acoustic calibration of the passive speaker in a particular environment, wherein performing the acoustic calibration of the passive speaker in the particular environment comprises outputting calibration audio according to the second configuration of the acoustic calibration; and apply calibration settings from the acoustic calibration that at least partially offset acoustic characteristics of the particular environment.

18. The method of claim 17, wherein:

the reader circuit comprises a near-field communication (NFC) reader or a radio-frequency identification (RFID) reader;

the passive speaker identification circuit comprises an NFC tag or an RFID tag;

the query signal comprises a first NFC signal or a first RFID signal; and the response signal comprises a second NFC signal or a second RFID signal.

19. The method of claim 17, further comprising:

causing the one or more audio amplifiers to drive the passive speaker via the one or more output terminals, wherein querying the passive speaker identification circuit comprises causing the reader circuit to output, via the one or more output terminals, the query signal while the one or more audio amplifiers drive the passive speaker via the one or more output terminals.

20. The method of claim 17, wherein the playback device further comprises:

a first filter electrically coupled between the one or more audio amplifiers and the one or more output terminals, wherein the first filter is configured to attenuate at least some frequencies above a threshold; and a second filter electrically coupled between the reader circuit and the one or more output terminals, wherein the second filter is configured to attenuate at least some frequencies above the threshold.

* * * * *